(12) United States Patent
Ordille et al.

(10) Patent No.: US 7,436,947 B2
(45) Date of Patent: Oct. 14, 2008

(54) METHOD AND APPARATUS FOR AUTOMATIC NOTIFICATION AND RESPONSE BASED ON COMMUNICATION FLOW EXPRESSIONS

(75) Inventors: Joann J. Ordille, South Orange, NJ (US); Thomas A. Petsche, Neshanic Station, NJ (US); Philip L. Wadler, Stirling, NJ (US)

(73) Assignee: Avaya Inc., Basking Ridge, NJ (US)

( * ) Notice: Subject to any disclaimer, the term of this patent is extended or adjusted under 35 U.S.C. 154(b) by 699 days.

(21) Appl. No.: 10/184,325

(22) Filed: Jun. 26, 2002

(65) Prior Publication Data

US 2003/0215067 A1    Nov. 20, 2003

(51) Int. Cl.
*G06F 15/16* (2006.01)
*H04M 7/00* (2006.01)
*H04J 3/16* (2006.01)

(52) U.S. Cl. .................. 379/219; 709/204; 709/201; 370/465

(58) Field of Classification Search ... 379/88.13–88.18, 379/88.22, 88.23, 88.27, 93.28, 93.31, 93.32, 379/46–49, 219–221.06; 370/395.52, 395.5, 370/395.22, 465; 709/204–206, 232, 228.229, 709/229–231, 201, 227–228, 234, 240
See application file for complete search history.

(56) References Cited

U.S. PATENT DOCUMENTS

| | | | |
|---|---|---|---|
| 5,559,867 A | | 9/1996 | Langsenkamp et al. |
| 5,742,668 A | * | 4/1998 | Pepe et al. .................. 455/415 |
| 5,912,947 A | | 6/1999 | Langsenkamp et al. |
| 6,032,188 A | * | 2/2000 | Mairs et al. .................. 709/234 |
| 6,091,724 A | * | 7/2000 | Chandra et al. .............. 370/390 |

(Continued)

OTHER PUBLICATIONS

Cardelli et al., "Service Combinators for Web Computing," IEEE Transactions on Software Engineering, vol. 25, No. 3, 309-316 (May-Jun. 1999).

(Continued)

*Primary Examiner*—Fan Tsang
*Assistant Examiner*—Joseph T Phan
(74) *Attorney, Agent, or Firm*—Ryan, Mason & Lewis, LLP

(57) ABSTRACT

A disclosed notification and response system enables applications to communicate with recipients using a number of different media. The notification and response system (i) sends requests to one or more recipients, using the medium specified by each individual recipient; (ii) collects and processes responses; and (iii) forwards the responses to their final destination by means of the medium specified by the final destination. Applications frame requests in at least one supported human language and media format, and the request is delivered to the appropriate recipient(s), according to their preferences. Communication flow expressions specify the recipients for a given request, and how, when and where each recipient shall receive the request. Requests are dynamically updated, and the parameters of a communication flow expression are not evaluated, until the request is delivered. Communication flow rules specify recipient's communication preferences and tailor communication flows to characteristics of the sender, the topic or scheduling constraints. Communication flow expressions are evaluated using a three-valued logic: notification failure (maybe), response failure (false) and response success (true). Primitives specify simultaneous or sequential contact, and when execution of the sub-expression should terminate by defining a logical combination of success test results.

34 Claims, 18 Drawing Sheets

U.S. PATENT DOCUMENTS

| | | | |
|---|---|---|---|
| 6,343,321 B2* | 1/2002 | Patki et al. | 709/227 |
| 6,463,462 B1 | 10/2002 | Smith et al. | |
| 6,483,804 B1* | 11/2002 | Muller et al. | 370/230 |
| 6,643,705 B1* | 11/2003 | Wallace et al. | 709/240 |
| 2002/0035607 A1* | 3/2002 | Checkoway et al. | 709/206 |
| 2002/0120760 A1* | 8/2002 | Kimchi et al. | 709/230 |
| 2003/0187992 A1* | 10/2003 | Steenfeldt et al. | 709/227 |
| 2003/0217109 A1* | 11/2003 | Ordille et al. | 709/206 |
| 2004/0028077 A1* | 2/2004 | Gray et al. | 370/466 |
| 2004/0066925 A1* | 4/2004 | Rosera et al. | 379/207.02 |
| 2004/0095939 A1* | 5/2004 | Yang | 370/395.52 |
| 2004/0111476 A1* | 6/2004 | Trossen et al. | 709/206 |

OTHER PUBLICATIONS

Handley et al., "SIP: Session Initiation Protocol," Network Working Group, 1-153 (Mar. 1999).

Rosenberg et al., "The Heart of Wireless UC Control: Communications Personalization, The Unified-View," 1-5, (Apr. 9, 2001) URL:http://www.unified-view.com/caa_04_09_01.html.

Lennox et al., "CPL: A Language for User Control of Internet Telephony Services," Internet Engineering Task Force, 1-64, (Nov. 14, 2000).

Lennox et al., "CPL: A Language for User Control of Internet Telephony Services," Internet Engineering Task Force, 1-68, (Nov. 21, 2001).

"Wireless Access Protocol 1.2.1," WAP Forum Jun. 2000 (WAP1.2.1) Specifications, 1-6, http://www.wapforum.org/what/technical_1_2_1.htm (Jun. 2000).

Schulzrinne et al., "SIP Caller Preferences and Callee Capabilitites," Internet Engineering Task Force, Internet Draft, Columbia University (Nov. 2000).

* cited by examiner

FIG. 3
REQUEST DATABASE 300

| 330 REQUEST IDENTIFIER | 335 REQUESTER IDENTIFIER | 340 FINAL RESPONSE DESTINATION | 345 SUBJECT | 350 MAXIMUM LIFETIME | 355 LANGUAGE(S) | 360 CONTENT TYPE(S) | 365 COMMUNICATION FLOW EXPRESSION | 370 PUBLIC FLAG | 375 STATUS |
|---|---|---|---|---|---|---|---|---|---|
| 305 | | | | | | | | | PENDING |
| 310 | | | | | | | | | COMPLETED |
| ... | ... | ... | ... | ... | ... | ... | ... | ... | ... |
| 315 | | | | | | | | | CANCELLED |

FIG. 5
RECIPIENT PREFERENCE AND ROLE DATABASE 500

| RECIPIENT NAME 530 | RECIPIENT TYPE 540 | PERSONAL COMMUNICATION FLOW 550 |
|---|---|---|
| JOANN | PERSON | (CELL RACES EMAIL) DELEGATES JERRY |
| SysAdmin | ROLE | (SAM BETWEEN 0:800 – 16:59) or (SUE BETWEEN 17:00 – 00:59) or (GREG BETWEEN 01:00 – 07:59) DELEGATES SysAdmin |
| REVIEWERS | NAMED COMMUNICATION FLOW | CHRIS AND JERRY AND BENGI AND JENNY |
| ... | ... | |
| WEB | CONTACT METHOD | |

505
510
515
520

FIG. 7
RECIPIENT PREFERENCE AND ROLE DATABASE
~500

| RULE NAME | ACTIVE | ORDER | CONDITION | cfExpression |
|---|---|---|---|---|
| ... | | | | |
| MgrRule | YES | 1 | Requester = "cmk" or Requester = "rsethi" | (UrgentCF BETWEEN 08:00 - 20:00) RACES RelaxedCF |
| FamilyRule | YES | 2 | Title = "Family*" | UrgentCF RACES RelaxedCF |
| PaperwrkR | YES | 900 | True | RelaxedCF |
| ... | | | | |

710 — MgrRule
720 — FamilyRule
730 — PaperwrkR

FIG. 8
PRIMITIVE TABLE
800

| PRIMITIVE | PRIMITIVE PROPERTIES | TRUTH TABLE |
|---|---|---|
| A AND B | A AND B SHOULD BE CONTACTED SIMULTANEOUSLY AND THAT THE SUB-EXPRESSION WILL SUCCEED IF AND ONLY IF BOTH A AND B SUCCEED. THIS MEANS THAT IF EITHER A OR B FAILS, THE SUB-EXPRESSION WILL FAIL, SO ANY PENDING CONTACTS ARE CANCELLED. | FIG. 9A |
| A THEN B | SIMILAR TO AND; BUT SPECIFIES THAT A SHOULD BE CONTACTED FIRST AND, ONLY IF A RESPONDS SUCESSFULLY, B SHOULD BE CONTACTED NEXT. THE SUB-EXPRESSION SUCCEEDS ONLY IF BOTH A AND B RESPOND SUCCESSFULLY. | FIG. 9B |
| A OR B | A AND B SHOULD BE CONTACTED SIMULTANEOUSLY AND THAT THE SUB-EXPRESSION WILL SUCCEED AS LONG AS EITHER A OR B SUCCEED. AS SOON AS EITHER A OR B SUCCEEDS, THE SUB-EXPRESSION SUCCEEDS, SO ANY PENDING CONTACTS ARE CANCELLED. THE SUB-EXPRESSION MUST WAIT FOR BOTH CONTACTS TO FAIL IN ORDER TO DETERMINE THAT THE ENTIRE SUB-EXPRESSION HAS FAILED. | FIG. 9C |
| A ELSE B | SIMILAR TO OR: BUT SPECIFIES THAT A SHOULD BE CONTACTED FIRST AND THEN, ONLY IF THE RESPONSE IS A FAILURE, B SHOULD BE CONTACTED. THE SUB-EXPRESSION SUCCEEDS IF EITHER A OR B RESPONDS SUCCESSFULLY. | FIG. 9C |
| A RACES B | A AND B SHOULD BE CONTACTED SIMULTANEOUSLY BUT NOW THE EXPRESSION WILL TAKE THE VALUE (SUCCESS OR FAILURE) OF THE FIRST CONTACT TO RESPOND. AS SOON AS THE FIRST RESPONSE IS RECEIVED, THE OTHER PENDING CONTACT IS CANCELLED. | FIG. 9D |
| A DELEGATES B | SIMILAR TO RACES; BUT SPECIFIES THAT A SHOULD BE CONTACTED FIRST AND, ONLY IF A DOES NOT RESPOND, THEN B SHOULD BE CONTACTED. THE SUB-EXPRESSION TAKES THE FIRST NON-MAYBE RESPONSE. | FIG. 9D |
| NOT A | REVERSES THE OPERAND VALUE FOR TRUE OR FALSE AND DOES NOT ALTER THE OPERAND VALUE FOR MAYBE; ONLY HAS ONE OPERAND SO DOES NOT SCHEDULE MULTIPLE OPERANDS TO BE CONTACTED SEQUENTIALLY OR IN PARALLEL. | FIG. 9E |

FIG. 9A

| AND | F | X | T |
|---|---|---|---|
| F | F | F | F |
| X | $F_b$ | $X_b$ | $X_b$ |
| T | $F_b$ | $X_b$ | $T_b$ |

FIG. 9B

| THEN | F | X | T |
|---|---|---|---|
| F | F | F | F |
| X | X | X | X |
| T | $F_b$ | $X_b$ | $T_b$ |

FIG. 9C

| OR ELSE | F | X | T |
|---|---|---|---|
| F | $F_b$ | $X_b$ | $T_b$ |
| X | $X_b$ | $X_b$ | $T_b$ |
| T | T | T | T |

FIG. 9D

| RACES \ DELEGATES | F | X | T |
|---|---|---|---|
| F | F | F | F |
| X | $F_b$ | $X_b$ | $T_b$ |
| T | T | T | T |

FIG. 9E

| NOT | |
|---|---|
| F | T |
| X | X |
| T | F |

FIG. 10

PRIMITIVE COUNT TABLE                   1000

| | TRUE RETURNED | FALSE RETURNED | MAYBE RETURNED | TOTAL FOR MAYBE |
|---|---|---|---|---|
| AND | 2 | 1 | 1 | 2 |
| THEN | 2 | 1 | 1 | 1 |
| OR | 1 | 2 | 1 | 2 |
| ELSE | 1 | 2 | 1 | 2 |
| RACES | 1 | 1 | 2 | 2 |
| DELEGATES | 1 | 1 | 2 | 2 |
| VOTES | X | C + 1 - X | 1 | C + 1 - X |
| POLLS | X | C + 1 - X | 1 | C + 1 - X |

Request Submission

| Home | Request | Result | User | Management | CommFlow |

Requester: joann@avaya.com

Title: XUI Meeting, Monday, 3 pm

Recipients: (petsche and yangqian)then cmk

Message: Will you attend a XUI Project Meeting on Monday at 3 pm in the Moon Conference Room?

See also:

Reply Method:
- ○ OK
- ○ True or False
- ⊙ Yes or No
- ○ One true button with the message: [ ]
- ○ two true buttons with the messages: [ ] [ ]
- ○ Select one from a list, enter a list separated by a semi-colon: [ ]

[Submit]  [Reset]

To: joann@avaya.com
Subject: Results from Xui re 'XUI Meeting, Monday, 3 pm'

Results

| Home | Request | Result | User | Management | CommFlow |

| Respondent | Petsche, Thomas A | Yang, Qian % |
|---|---|---|
| Submit | Yes | No |

Request Submission

| Home | Request | Result | User | Management | CommFlow |

Requester: petsche@avaya.com

Title: Urgent IPO Opportunity

Recipients: Preferred Customers between 05/09/01 10:00 – 05/09/01 14:00

Message: Would you like to get in on the ground floor of a great new company called Brand New Company? Blocks of stock at the IPO price are available

See also: http://brandnewcompany.com/

Reply Method:
- ○ OK
- ○ True or False
- ○ Yes or No
- ○ One true button with the message: _____
- ○ two true buttons with the messages: _____ _____
- ⊙ Select one from a list, enter a list separated by a semi-colon:
  Buy 2000 shares; Buy 1000 shares; Buy 500 shares; Buy no shares

[Submit]   [Reset]

Request

| Home | Request | Result | User | Management | CommFlow |

Would you like to get in on the ground floor of a great new company called Brand New Company? Blocks of stock at the IPO price are available for 4 hours only! Please consider this opportunity and let us know how we can assist you.

<u>More Information</u> related to the request is available.

○ Buy 2000 shares
○ Buy 1000 shares
○ Buy 500 shares
○ Buy no shares

[Submit]

(sent by wav of xui.research.avavalabs.com)

METHOD AND APPARATUS FOR AUTOMATIC NOTIFICATION AND RESPONSE BASED ON COMMUNICATION FLOW EXPRESSIONS

CROSS REFERENCE TO RELATED APPLICATIONS

This application claims the benefit of U.S. Provisional Application No. 60/291,087, filed May 15, 2001, and claims priority to PCT Application Serial Number PCT/US02/15513, filed May 14, 2002.

TECHNICAL FIELD

The present invention relates generally to methods and apparatus for communicating with one or more recipients, and more particularly, to methods and apparatus for automatic notification and response between an application and one or more recipients using one or more different media types.

BACKGROUND ART

Enterprise applications need to contact people and have requirements for how the contact is done and what responses, if any, are collected. For example, applications may need to contact all people who have certain interests, or a particular list of people or a single person. Applications may need to contact someone immediately in a crisis or they may want to remind someone of a task at an appropriate time. Enterprise applications also have requirements about what to do when the contact is unsuccessful, where success is something defined by the enterprise.

Recipients, on the other hand, have their own preferences about how and when they are contacted. For example, recipients may want particular people, such as a boss or family member, or people who represent particular interests, such as an executive from a Fortune 500 Company, to be given more flexibility in establishing real-time contact. In addition, recipients may routinely delay contact about known tasks, such as weekly status or expense updates, until a convenient time or place. Oftentimes, the preferences of recipients are at odds with the preferences of an enterprise or the implementation of a specific application. In those cases, recipients find creative ways to work around the application constraints, in order to satisfy their preferences, or find the enterprise's processes frustrating or even annoying.

A number of notification systems have been proposed or developed to enable applications to communicate with one or more recipients. Existing notification systems, however, are typically limited in media and function. For example, a notification system may only send an electronic mail message to a cellular telephone or pager. In addition, existing notification systems do not support flexible use of different communication infrastructures. The growth of wireless services, for example, such as those using the Wireless Access Protocol (WAP), described in WAP Forum, "Wireless Access Protocol 1.2.1," June 2000, has led to the development of a number of notification and response services that contact only one device and thereby push and receive responses to web forms on cellular telephones.

The Session Initiation Protocol (SIP), as described, for example, in M. Handley et al., "SIP: Session Initiation Protocol," RFC 2543, March 1999, provides a registry where users can be associated with particular devices by registering a SIP Uniform Resource Locator (URL) for the device. A number of SIP proxies exist that support the ability to contact the list of URLs recorded in the registry for a given user in parallel or sequentially to establish communication with the user. Call Processing Language (CPL), as described, for example, in J. Lennox and H. Schulzrinne, "CPL: A Language for User Control of Internet Telephony Services," Draft RFC draft-ietf-iptel-cpl-05.txt, November 2001, is a language that is proposed for SIP proxies.

CPL allows users to specify in advance how to select a specific URL given characteristics of a SIP INVITE message (that is used in accordance with the SIP protocol to establish contact with the user), such as interpretations of the strings in the sender and target addresses or the subject of the INVITE. CPL also allows users to specify a timeout, so a sequential series of INVITE messages to specific devices can be tried when attempting to establish communication with the recipient. Moreover, SIP allows each SIP device or endpoint to specify the preferences of its user as a weighted list of media types and human languages. Senders are asked to provide, from the media types and human languages that they have available, the most highly weighted media type and human language. SIP and CPL do not provide support for interpreting the result of a communication, and taking different actions depending on that result. For example, once a telephone call is successfully answered, SIP and CPL do not discover if the user hung up the telephone or actually answered the request.

While sufficient techniques exist for specifying data flow or program flow through a system, the techniques that are available for specifying communication flow are typically rudimentary. A communication flow is the path of a request from requester to recipients. These existing communication flow techniques typically equate specifying a recipient for a request with some predefined method of contact such as sending an electronic mail message to a mailbox or a message to a pager. While a communication flow path is often thought of as a simple connection between two parties, modern communication capabilities enable a variety of communication flows. For example, a given communication flow can (i) contact recipients or devices used by a recipient in parallel or sequentially; (ii) wait for all recipients or just some of the recipients to respond to a request; or (iii) take a different direction when a communication error occurs.

A need therefore exists for a general technique for conveniently and accurately specifying the parameters of a communication flow, such as the recipients for a request, and how, when and where each recipient shall receive the request and how the responses direct further communication. A further need exists for a technique for specifying the parameters of a communication in a manner that captures and combines the requirements of applications and the preferences of recipients.

DISCLOSURE OF INVENTION

Generally, a notification and response system is disclosed that enables one or more applications to communicate with one or more recipients using a number of different media, such as electronic mail, telephone, web page, pager or facsimile. Generally, the notification and response system (i) sends requests to one or more recipients, using the medium specified by each individual recipient; (ii) collects and processes responses; and (iii) forwards the responses to their final destination by means of the medium specified by the final destination.

Applications can frame requests in any one of a number of supported human languages and media formats, and the request is automatically delivered to the appropriate recipient(s), in accordance with the media and human language preferences of each recipient. Thus, recipients receive messages from different applications or systems (or both) in accordance with their specified preferences and endpoint capabilities. The responses are returned to each application in a format convenient to the corresponding application. An application can send messages to one or more named recipients or in accordance with predefined recipient lists or roles. A recipient preference and role database provides centralized management of the recipient lists, roles and recipient preferences. The recipient preference and role database records the role, people and device information, as well as related communication flow information.

Applications use communication flow expressions to specify who to contact ("Bob"), under what conditions to contact ("only if Ann said yes") and when to contact ("between 9 a.m. and 5 p.m. weekdays"). Recipients specify rules for refining communication flow expressions with details of how, i.e., which devices to use, and when to contact them. Recipients may also automatically delegate some requests to other recipients. According to one feature of the invention, the requests can be dynamically updated with new information until the request is delivered, so recipients receive the most current business information. In addition, the parameters of a communication flow expression (the who, what and when) are evaluated at the time the request is delivered, so that the request is delivered in accordance with the most up-to-date recipient preferences.

An application sends a request to the disclosed notification and response system asking that a particular notification message be sent to one or more recipients and responses to that notification be collected and returned to the requester or forwarded to another application. The request consists of (i) a notification message, (ii) request parameters, (iii) a communications flow expression, and (iv) responses. The notification message can be framed in any one of a number of supported human languages and media formats, and the request is automatically delivered to the appropriate recipient(s), in accordance with the media and human language preferences of each recipient. The request parameters specify information that must be available to the notification and response system to control the behavior of the request or to properly format the request (or both).

Communication flow expressions capture and combine the requirements of applications and preferences of recipients. The communication flow expression portion of a request specifies the recipient(s) associated with a request (the "who"), as well as how, when and where such recipients shall receive the request. A recipient can be a role (e.g., "customer service"), a person (e.g., "Jerry"), a device (e.g., "800-555-1234") or a further communication flow expression to be evaluated. Each recipient is active, because recipients can provide communication flow rules that specify their communication preferences and to tailor their communication flow to characteristics of the sender, the topic of the request or the demands of their schedule. Generally, the communication flow rules replace the recipient's name in the communication flow with further details about when, where and how to contact the recipient, according to the recipient's preferences. Communication flow expressions also specify what action to take when a particular recipient fails to respond successfully to a request.

The notification and response system can employ success tests in a communication flow to evaluate the values specified by a respondent to determine whether a particular contact has succeeded or not. A respondent is a person who has received a request and who has returned a response. As responses are received, the notification and response system will forward the attribute value pairs of each individual response or, after the request completes, collated results to the final destination specified in the initial request.

A communication flow failure can occur for two reasons. First, there may simply be a failure to contact a recipient or a recipient may never respond to a notification, referred to as notification failure (the inverse is referred to as notification success). Second, the recipient may be contacted and subsequently accept or reject the request, referred to as response success (saying "true" or "yes") or response failure (saying "false" or "no"), respectively.

According to another feature of the invention, communication flow expressions are evaluated using a three-valued logic. The three possible values of the logic are notification failure (maybe), response failure (false) and response success (true). Notification success is a transitory state identified that occurs before response success or response failure. With many devices, it is only possible to know that a notification has been received when a response from the recipient is received. Thus, the success expression associated with a request can specify a three-valued logical expression on the variables that may be included in the response received from the recipient. The success expression tests logical combinations of values in a response and, if there is response success then the contact evaluates to "true," if there is response failure then the contact evaluates to "false," and otherwise, if no more time is allowed for a response, there is notification failure and the contact evaluates to "maybe."

Each communication flow expression includes one or more primitives to specify whether to contact the recipients simultaneously or sequentially, and when execution of the sub-expression should terminate by defining a logical combination of success test results. More specifically, primitives combine directions for parallel or sequential communication with an evaluation of how the status of communication with a recipient affects the communication flow. Other primitives control when contact is made or how to construct a communication flow from lists of objects found by searching the directory.

The primitives employed by the disclosed notification and response system can naturally be grouped into parallel/sequential pairs, as follows: and/then, or/else, races/delegates, and votes/polls. Parallel and sequential primitives differ in how the operands are evaluated. In parallel primitives, each recipient is contacted in parallel. Outstanding requests are canceled when they are no longer necessary to determine the truth value of the primitive. In sequential primitives, requests are made to each recipient in the order that they appear. When that recipient responds, a request is sent to the next recipient, if necessary, to determine the truth value of the primitive. Each primitive evaluates to true, false or maybe depending on the success of the communication with the recipients.

A more complete understanding of the present invention, as well as further features and advantages of the present invention, will be obtained by reference to the following detailed description and drawings.

BRIEF DESCRIPTION OF DRAWINGS

FIG. 3 is a sample table from an exemplary request database employed by the request manager of FIG. 2;

FIG. 5 is a sample table from an exemplary recipient preference and role database of FIG. 2;

FIG. 7 is a sample table from another portion of the exemplary recipient preference and role database of FIG. 5;

FIG. 8 is a sample table indicating a set of exemplary communication flow expression primitives in accordance with the present invention;

FIGS. 9A through 9E illustrate truth tables for various primitives indicated in FIG. 8;

FIG. 10 is a sample table summarizing the counts for each of the primitives indicated in FIG. 8;

FIG. 14 illustrates an exemplary web form that allows an application to specify the parameters of a request for a team meeting;

FIG. 15 illustrates the compiled results of the request of FIG. 14;

FIG. 16 illustrates an example where a requester offers shares of stock in block allotments for the initial public offering (IPO) of a new company to preferred customers for a four-hour period; and FIG. 17 illustrates an exemplary electronic mail message that is sent to certain recipients in accordance with the request of FIG. 16.

BEST MODES FOR CARRYING OUT THE INVENTION

Figure 1:
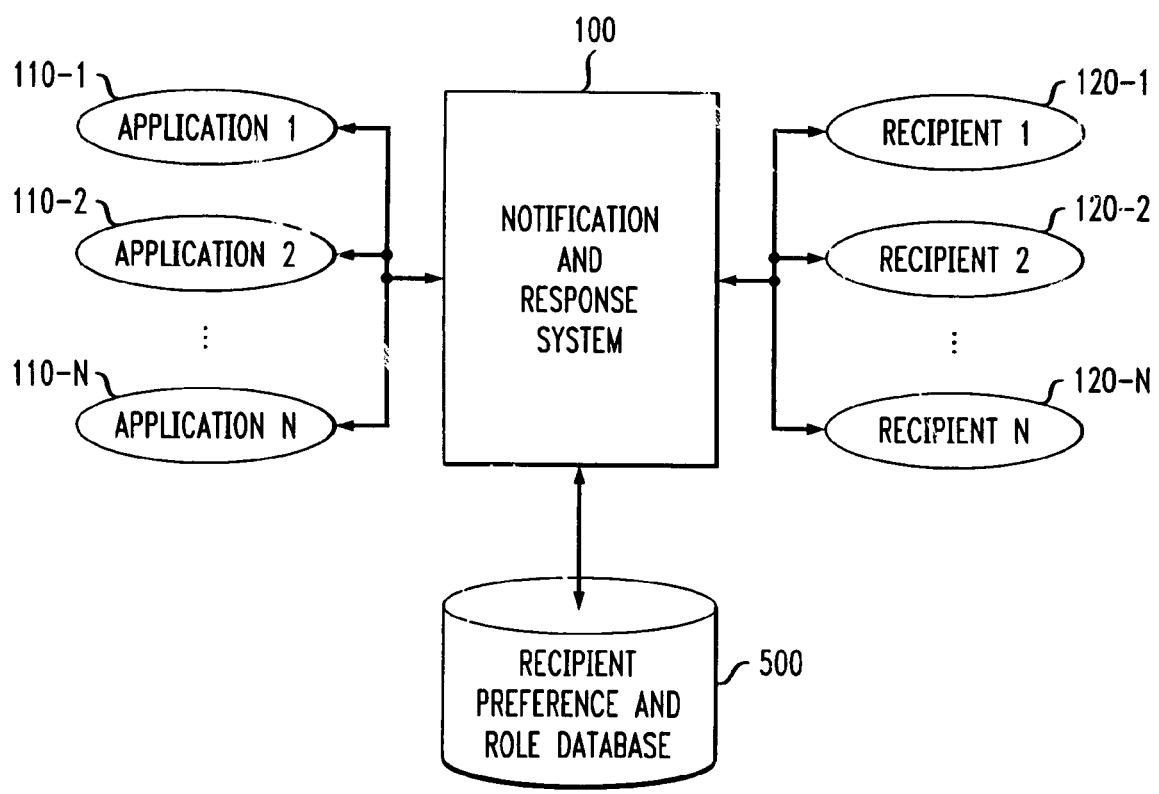
FIG. 1 illustrates a notification and response system incorporating features of the present invention.

The present invention provides a notification and response system 100, shown in FIG. 1, that enables one or more applications 110-1 through 110-N, hereinafter, collectively referred to as applications 110, to communicate with one or more recipients 120-1 through 120-N, hereinafter, collectively referred to as recipients 120, by a number of different media, such as electronic mail, telephone, web page, pager or facsimile. Generally, the notification and response system 100 (i) sends requests to one or more recipients 120, using the medium specified by each individual recipient 120; (ii) collects and processes responses; and (iii) forwards the responses to their final destination by means of the medium specified by the final destination.

Figure 2:
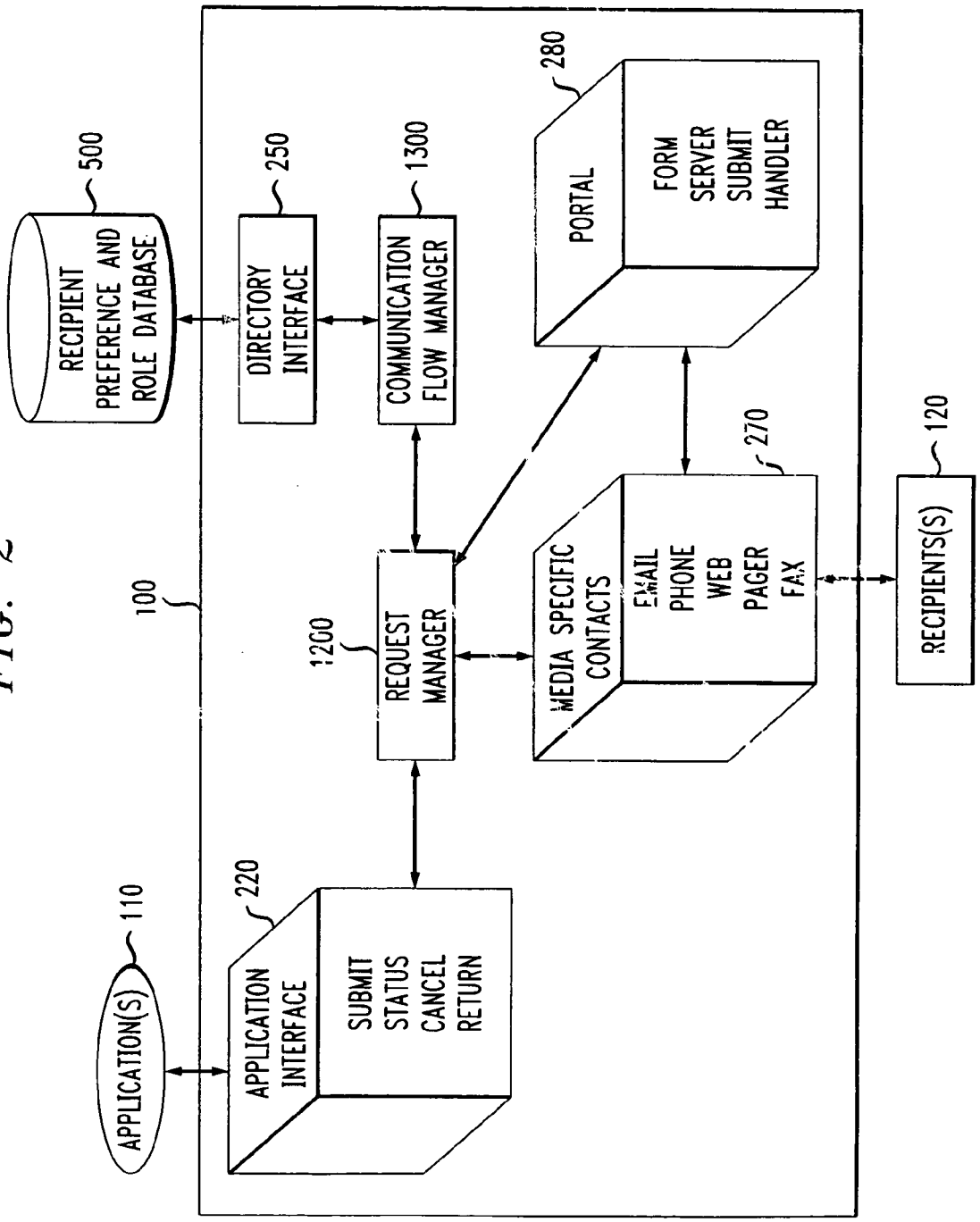
FIG. 2 illustrates the notification and response system of FIG. 1 in further detail.

FIG. 2 illustrates the notification and response system 100 in further detail. As shown in FIG. 2 and discussed further below, an application 110 submits a request to a request manager 1200 by means of an application interface 220 that provides services for submitting or canceling a request, checking the status of a request and returning results to the applications 110. Applications can submit notification requests and requests to cancel pending notifications to the appropriate application interface 220, for example, via an HTTP POST.

The application interfaces 220 may be embodied, for example, as Simple Object Access Protocol (SOAP) or a number of commercial Enterprise Application Integration (EAI) interfaces, such as the MQSerieS™ interface, commercially available from IBM Corp., or the J2EE™ interface, commercially available from Sun Microsystems, Inc. For each request, the application interfaces 220 map between the external request representation and the internal representation of the notification and response system 100. Likewise, for each response, the application interfaces 220 map between the internal response representation of the notification and response system 100 and the external representation.

The request manager 1200, discussed below in conjunction with FIG. 11, tracks all the requests that have been submitted. As discussed below in conjunction with FIG. 3, the request manager 1200 maintains a request database 300 that includes information about each request and indicates the status of each request, such as pending, cancelled or completed. The request database 300 can be maintained in memory or a persistent database in which the requests and their current state (including responses) can be stored. Among other functions, the request manager 1200 assigns a unique identifier to each request that can be used to identify the request that a recipient 120 should receive and the request to which a response applies. In addition, the request manager 1200 modifies requests, if necessary, to ensure that the responses are forwarded back to the notification and response system 100.

As previously indicated, applications 110 use communication flow expressions to specify the parameters of a given request. The request manager 1200 follows the directions of the communication flow in performing each media specific communication with a recipient. The request manager 1200 uses the communication flow expression services of a communication flow manager 1300, discussed below in conjunction with FIG. 13. The interaction between the request manager 1200 and the communication flow manager 1300 is discussed below in conjunction with FIG. 11.

Generally, the communication flow manager 1300 interprets the target communication flow defined in the request into a more efficient, tree structured internal representation. In addition, the communication flow manager 1300 iteratively traverses the tree representation and, in the process, expands non-device recipients and instantiates devices. At each iteration, the communication flow manager 1300 enters any success test results that have become available and determines whether any pending contacts should be canceled or any new contacts launched. The communication flow manager 1300 thus interprets and executes the communication flow expressions to determine how to deliver the request to the appropriate recipients 120 and to determine how to respond to the success or failure of each communication attempt.

A directory interface 250 maps between the internal representation of roles, people and devices used by the notification and response system 100 and the representation in the recipient preference and role database 500. In addition, the directory interface 250 handles searches and other requests. The communication flow manager 1300 is generally presented with a communication flow that contacts roles and recipient's names that need to be resolved to devices that the notification and response system 100 knows how to contact. The directory schema and the internal representation in the notification and response system 100 can be mapped in a single class in order to support the use of other types of databases and make the internal representation independent of the particular directory schema in use. This class also provides a set of specific search and retrieval methods.

The media specific contacts 270 handle the actual delivery of the notification and, in some cases, response collection. If contact via a particular medium cannot be made after a specifiable duration or number of attempts, a notification failure message is returned to the request manager 1200. The media specific interfaces 270 are discussed further below in a section entitled "Media Specific Interfaces." For each notification message, the media specific interfaces 270 map between the internal request document representation of the notification and response system 100 and an external representation. Likewise, for each response, the media specific interfaces 270 map between the external response representation and the internal representation of the notification and response system 100.

A web portal 280 serves data to the recipients 120 through a variety of media and collects responses. The web portal 280 is a collection of servlets that provide access to a recipient's pending, completed and cancelled notifications. This includes servlets that display a list of pending notifications so that the recipient can select one to read or listen to, as well as a servlet to display the notification and another servlet to collect the response. The web portal 280 is structured this way so that all notifications are delivered directly by the notification and response system 100 and all responses are collected by the notification and response system 100. The centralized implementation allows the content of the notification to be controlled, the notification to be personalized and the notification to incorporate previous responses. Personalization data from the recipient preference and role database 500 is handled by the same rewrite mechanisms that modify form action tags to point to the appropriate servlet.

The notification and response system 100 mediates all requests to the recipients 120 specified in the communication flow expression. This allows the notification and response system 100 to record responses and communicate those responses to the communication flow manager 1300. The communication flow manager 1300 takes different paths through the communication flow based on the content of those responses. For example, for an exemplary web application program interface (API), all requests are represented as web pages and those requiring responses include forms for accepting the response. The requests are rewritten to direct responses to a given URL, so completion status can be recorded before being rerouted to the final destination specified in the original request made to the notification and response system 100. The routing and return processing of the notification and response system 100 can be adapted to various methods of specifying requests and responses, such as those in unified messaging systems or XML-based APIs.

The present invention thus provides personalized message delivery (recipients receive messages when and how they want). The notification and response system 100 can deliver requests and collects responses in any one of a number of supported human languages and media formats, such as electronic mail, telephone, web page, pager or facsimile. In addition, the notification and response system 100 provides centralized request management for requesters and recipients, response collation, and transparent routing of requests from (and responses to) existing applications.

Requests

An application 110 sends a request to the notification and response system 100 asking that a particular notification message be sent to one or more recipients and responses to that notification be collected and returned to the requester or forwarded to another application. As used herein, a request consists of (i) a notification message, (ii) request parameters, (iii) a communications flow, and (iv) responses.

Notification Message

An application 110 can create one or more versions of a request in order to support delivery via different media and in different human languages. In other words, the application 110 prepares data files that will be converted by a servlet into the type of document that a recipient prefers to receive and then passes the URL of the servlet to the notification and response system 100. For example, an application 110 wishing to send a meeting notification to one or more recipients can create an HTML document containing the message along with a form to handle possible responses, if any. This HTML document would then be stored on a web server and the URL is passed to the notification and response system 100.

The use of a servlet to generate the message in a particular media format illustrates one of the advantages of the present invention. The media of the message can be tailored to the recipient's needs and preferences at the time of the delivery, and the content of the message can be generated at the time of delivery so that it always contains the most up-to-date information. For example, many of the media contacts employed by the present invention initially provide an indication to the recipient that a notification message is available for the recipient, such as a page indicating that the recipient must call a designated telephone number to retrieve a notification message or an electronic mail message containing a hyperlink to a web page containing the notification message. The recipient thereafter accesses the notification message and is presented with the up-to-date version of the notification message at the time of the access. In this manner, the requester can update the notification message until the recipient actually accesses the notification message.

Request Parameters

A request has an associated set of parameters. These parameters specify information that must be available to the notification and response system 100 to control the behavior of the request or to properly format the request (or both). As previously indicated, the request manager 1200 tracks all the notification requests that have been submitted using a request database 300 that includes information about each request and indicates the current status of each request, such as pending, cancelled or completed.

FIG. 3 is a sample table from an exemplary request database 300. As shown in FIG. 3, the exemplary request database 300 includes a plurality of records 305-315, each associated with a different request. For each request identified in field 330, the parameters recorded in the request database 300 include (i) a requester identifier (i.e., the name of the person or application that generated the request) in field 335; (ii) a response destination (e.g., a URL to which the responses should be forwarded or a communication flow expression indicating how to route the response, and an indication as to whether collated responses are to be sent at the end of the request or each response is to be forwarded when it is received) in field 340; (iii) subject (i.e., a brief description of the request that can be used, for example, in an email subject line) in field 345; (iv) maximum lifetime (i.e., the length of time that the notification and response system 100 should continue attempting to deliver notifications and collect responses, following which time all pending requests should be cancelled and any collected responses should be sent to their final destination) in field 350; (v) languages (i.e., the languages in which the notification message is available) in field 355; (vi) content types in which the message is available, such as HTML, VXML and plain text in field 360; the communication flow expression in field 365; (vii) a public/private flag indicating whether received responses should be visible or available to other designated recipients; and (viii) the current status of the request in field 375.

It is noted that the content of each notification message, including the subject heading, can be provided by a given application 110 in one or more supported human languages, or automatically translated in desired supported human languages. In a further variation, the language parameter in field 355 can be replaced by a rule that specifies how and when language translations should be obtained, and the content types parameter can be replaced by a rule that specifies how and when content types should be generated.

Communications Flow

As discussed further below, in a section entitled "Communication Flows," the notification and response system 100 employs communication flow expressions to specify the who, how, when and where of a communication. Communication flow expressions specify the recipients for a request. A recipient can be a role (e.g., "customer service"), a person (e.g., "Jerry"), a device (e.g., "800-555-1234"), a software application or agent (e.g., "calendar agent") or another communication flow expression. In addition, a communication flow expression specifies how, when and where the recipients shall receive the request. Communication flow expressions also specify what action to take when a particular recipient fails to respond successfully to a request.

Communication flow expressions capture and combine the requirements of applications and preferences of recipients. Communication flow expressions are active recipient lists. Each recipient is active, because recipients provide communication flow rules that replace their name in the communication flow with further details about when, where and how to contact them, according to the recipient's preferences. These communication flow rules allow recipients to incorporate their personal communication flow into the communication flow expression for the request. Recipients use the rules to specify their communication preferences and to tailor their communication flow to characteristics of the sender, the topic of the request or the demands of their schedule.

Responses

As discussed further below, in the section entitled "Communication Flows," the notification and response system 100 can employ success tests in a communication flow to evaluate the values specified by a respondent to determine whether a particular contact has succeeded or not. A respondent is a person who has received a request and who has returned a response. As responses are received, the notification and response system 100 will forward the attribute value pairs of each individual response or, after the request completes, collated results to the final destination specified in the initial request. In an exemplary implementation, the notification and response system 100 waits until the entire communication flow has been executed before returning any results, but the modification to return each response as it is received is trivial.

Communication Flows

Communication flows are characterized by communication flow expressions, success specifications, communication flow rules and parameters. Communication flow expressions integrate the communication requirements of applications with the communication preferences of users. Communication flow expressions specify the recipients for a request (either directly by name or by means of a defined recipient list or role). In addition, a communication flow expression specifies how, when and where the recipients shall receive the request. Communication flow expressions also specify what action to take when a particular recipient fails to respond successfully to a request.

Communication Flow Success/Failure Specifications

Communication flow success specifications describe the conditions for response success and failure at each step in the communication flow. In the exemplary implementation, communication flow success specifications support both a system-wide default success specification and a requester-defined success specification default for a particular communication flow. Alternatively, a test response status primitive, discussed below, allows a requester to specify the success specification for each recipient in the communication flow.

A communication flow failure can occur for two reasons. First, there may simply be a failure to contact a recipient or a recipient may never respond to a notification, referred to as notification failure (the inverse is referred to as notification success). Second, the recipient may be contacted and subsequently reject the request or answer it negatively, referred to as response failure (saying "no") or response success (saying "yes"). "No" and "yes" have a semantic component, because it is only the application that can determine whether or not the recipient has acceptably responded (e.g., said "yes") to a request for the purposes of continuing the communication flow. For example, response success may occur when a recipient reviews a document and votes against its acceptance. The recipient has said, "Yes, I am done with the review," and the communication flow continues with the next reviewer. On the other hand, response failure may occur when a recipient reviews and rejects a request for a software revision. The recipient has said "No, we will not do this software revision," and the communication flow ends or continues with error processing.

Figure 4:
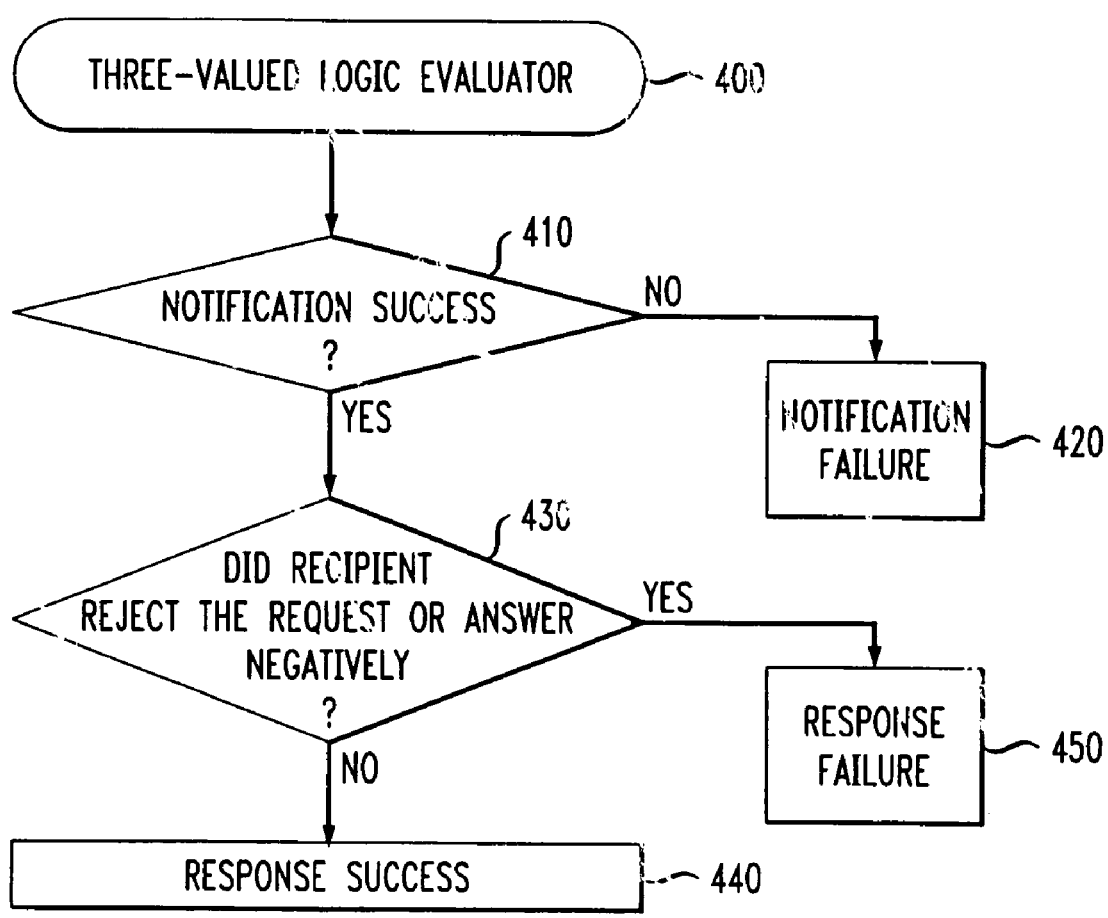
FIG. 4 is a flow chart illustrating a three-valued logic evaluator incorporating features of the present invention.

According to one aspect of the invention, communication flow expressions are evaluated using a three-value logic evaluator 400, shown in FIG. 4. The three possible values of the logic are notification failure (maybe) during step 420, response failure (false) during step 450 and response success (true) during step 440. As shown in FIG. 4, notification success is a transitory state identified during step 410 that occurs before response success or response failure, so it is not represented directly. With many devices, it is only possible to know that a notification has been received when a response from the recipient is received.

A success expression specifies a three-valued logical expression on the variables that may be included in the response received from the recipient 120. That is, a notification, in general, contains an HTML form, VXML dialog or equivalent object. The form, for example, associates a name with values specified by the respondent. A success expression tests logical combinations of values in a response and, if there is response success then the contact evaluates to "true," if there is response failure then the contact evaluates to "false," and otherwise, if no more time is allowed for a response, there is notification failure and the contact evaluates to "maybe."

For example, consider an HTML page containing a notification that contains one form with a single button named "Submit" that sets the value of the button to "true" when it is clicked. A success expression for this page would be "Submit=true." A notification of a stock price change might contain a pair of radio buttons named "Action" which can take the value "buy" or "sell" and another field named "Quantity" that can take a numeric value. A success expression for this page might be "Action=buy & Quantity>1000." A success test can be specified, for example, as "A ? Submit="true" ?," which means contact A and, when a response is received, define the contact to be "true" if the response assigns a value of "true" to the parameter "Submit." If the value of "Submit" is something other then true, then the contact is "false" and if no more time is allowed for a response to be received, the contact evaluates to "maybe."

An example illustrates the benefits of the three-value logic used in communication flow expressions over a two-value logic. Suppose a person wants to contact Tom if contacting Joann succeeds or Priya if contacting Joann fails. Using the conventional two-value logic primitives then and else, this relation may be expressed as follows:

(Joann then Tom) or (Joann else Priya).

Now suppose further that Joann uses the same logic to specify that she prefers to be contacted via cell phone, or if that fails via office phone, or if that fails to delegate the request to Jerry, as follows:

cell else office else Jerry.

There are problems inherent in this formulation, since the requester undoubtedly wants to contact Tom or Priya based on the outcome of an actual response from Joann, and Joann only wants Jerry contacted if she fails to respond (i.e., not if she responds with "no"). It is impossible to get all these outcomes from conventional two-value logic. As discussed in the following section, in the three-valued logic of the present invention, Tom is only contacted if Joann says "Yes," Priya is only contacted if Joann does not respond with "Yes," and Jerry is contacted only if Joann fails to respond at all.

Communication Flow Recipients

As previously indicated, communication flow expressions provide a flexible, general technique for specifying recipients for a request and how to direct a communication in response to the replies received from recipients. In an exemplary implementation, a recipient preference and role database 500, shown in FIG. 5, can be embodied as a Lightweight Directory Access Protocol (LDAP) directory, described, for example, in M. Wahl et al., "Lightweight Directory Access Protocol (v3)," RFC 2251 (December 1997), incorporated by reference herein. The recipient preference and role database 500 holds objects that describe the recipients that can appear in a communication flow expression. As shown in FIG. 5, the exemplary recipient preference and role database 500 includes a plurality of records 505-520, each associated with a different recipient.

For each recipient identified in field 530, the recipient preference and role database 500 identifies the recipient type in field 540 and the personal communication flow defined for the recipient in field 550. The types of recipients that may appear in field 540 are a person, a role, an application, a device, a named communication flow or a method for contacting an individual recipient. While a person, role or named communication flow object can specify a communication flow expression for contacting recipients, the method for contacting an individual recipient or an application (or media contact object) is a terminal object in the translation of recipient names (i.e., the object is not translated further in the directory). The object includes attributes that are important for reaching the individual or application that may act as an agent for the individual; specifically, the address, protocol, timeout and retry intervals for making contact.

According to another aspect of the invention, referred to as dynamic communication flow expression substitution, the binding of recipient names to information in the recipient preference and role database 500 is delayed until the time of contact. Thus, the late binding aspect of the present invention implies that a recipient described as a role, such as the CEO of a company, can change until the system 100 begins its attempt to notify the CEO. In addition, the personal communication flow of a recipient, such as the office phone number, can change to an away phone during a trip and still be used successfully by a request submitted before the trip began.

When a recipient is contacted by a media contact, the recipient can request that a different communication flow expression be substituted for his or her expression in the communication flow. This allows the recipient to delegate tasks dynamically to more appropriate recipients. It also allows recipients to delay the task by substituting into the communication flow a communication flow expression that has a delay clause, for example, "Joann after+04:00," which generates a reminder to process the request after a four hour delay.

FIG. 5 provides a number of exemplary objects in the exemplary recipient preference and role database 500 that illustrate the different types of recipients. A discussion of the exemplary primitives employed in the recipient preference and role database 500 is discussed below in a section entitled "Primitives." For example, as shown in record 505, the recipient "Joann" specifies the following personal communication flow for all requests with the expression:

(cell races email) delegates Jerry

Thus, when contacting Joann, a call should be made to Joann's cell phone and an email should be sent to her in parallel. If Joann doesn't answer, Jerry should be contacted to take the request for Joann (in accordance with the personal communication flow for Jerry). If Joann answers the request herself, Jerry is never contacted.

In the example shown in record 510, the role SysAdmin specifies a personal communication flow for routing requests to the administrator for the current shift:

(Sam between 0:800-16:59 or Sue between 17:00-00:59 or Greg between 01:00-07:59) delegates SysAdmin The role in record 510 directs requests to the system administrator working during specific times during a workday that starts at 8 a.m. If contact cannot be made with any administrator during the first work day of request processing, the clause in parentheses fails and contact attempts are repeated during the next day via the recursive SysAdmin reference.

It is noted that recursive references to the recipient, for example, those in the SysAdmin role, are only permitted to follow a sequential primitive in a communication flow where other termination conditions exist. In the SysAdmin example, the request completes with true or false when a response is received or with notification failure (maybe) when a requester set time-out is reached.

Even with this precaution, it is possible to loop through circular name references in the directory. For example, Joann's communication flow expression can say "Tom" and Tom's communication flow expression can say "Joann." In this case also, distinguishing between parallel and sequential recursive references avoids uncontrolled, resource-intensive looping. All parallel circular references and sequential circular references without other terminating conditions are prevented through analysis of the name translation history. While the previous example concerning Joann and Tom would be an error, the following situation would be acceptable: Joann's communication flow expression tries to contact her via email and delegates to Tom on failure and Tom's communication flow expression simply delegates back to Joann (because Tom is on vacation). As a final precaution for requests that loop rapidly or over a long period to the same recipients, the communication flow expression can return an error when a specified maximum number of contact attempts to a recipient is exceeded.

To continue the examples in FIG. 5, the named communication flow "Reviewers" in record 415 specifies a list of recipients that must be contacted in parallel for a review:

Chris and Jerry and Benji and Jenny

A request to Reviewers succeeds when all reviewers respond successfully. As discussed below in the section entitled "Communication Flow Primitives," a "votes" primitive can be used to alter the success criteria for this list. For example, Reviewers votes 2 completes successfully when two reviewers respond successfully.

It is noted that the media contact objects in the recipient preference and role database 500 can also be agents. For example, a calendar agent might supply three media contacts that are combined in the following communication flow:

HoldCal then (Cell then ScheduleCal else CancelCal)

If HoldCal finds the requested date available, then the user is contacted via cell phone to approve the meeting purpose. If the user approves the meeting purpose, the meeting time is scheduled; otherwise, the meeting is canceled.

LDAP Directory Tree

Figure 6:
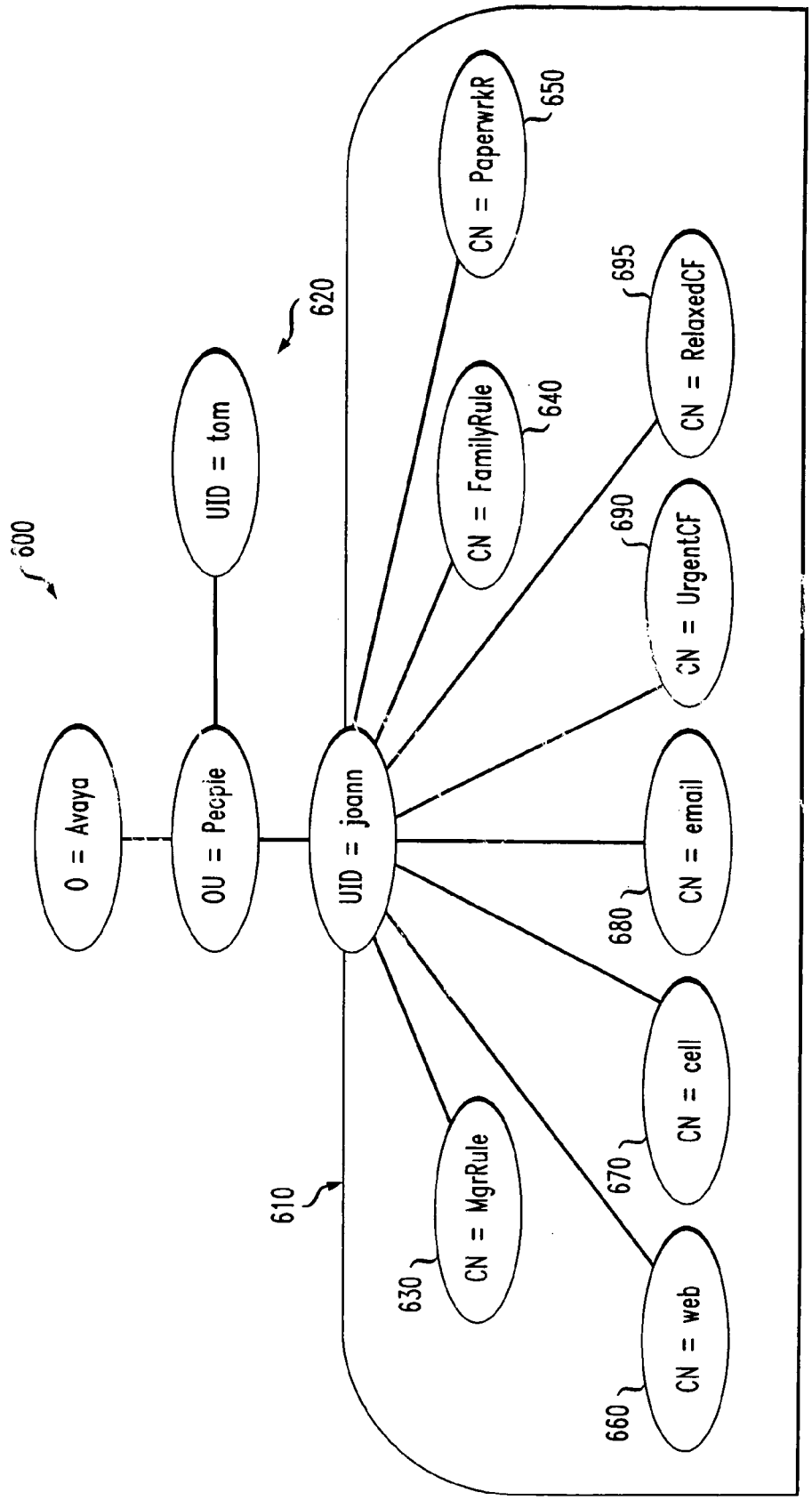
FIG. 6 illustrates a portion of an LDAP directory tree from the recipient preference and role database of FIG. 5, indicating the personal naming context of a number of recipients.

FIG. 6 illustrates a portion of an LDAP directory tree 600 indicating the personal naming context of a number of recipients. The ILDAP directory tree 600 is a representation of the user preference information recorded in the recipient preference and role database 500. For example, the ILDAP directory tree 600 shown in FIG. 6 includes a personal naming context 610 for a recipient, Joann, and a personal naming context 620 for a recipient, Tom. The personal naming context 610 for recipient Joann has defined rules, communication flow expressions and media contacts. The recipient Tom uses default rules, communication flow expressions and media contacts.

Communication Flow Rules and Parameters

Communication flow rules specify when to translate a recipient name to a particular personal communication flow expression. Recipients can specify conditions on parameters of the request, such as the title and requester parameters, to control which personal communication flow expression is used for a particular request. For example, recipients can choose certain topics, as they are expressed in the title, or requesters for immediate attention via cell phone. They can choose other kinds of requests for later attention via email or the web.

Unlike other preference-based systems, preference processing in the communication flow manager 1300 is a general mechanism that is integral to the processing of the delivery of a request. The rules and personal communication flow expressions of a recipient 120 establish a personal naming context 610 for that recipient 120. The recipient's name and names in the recipient's rules or communication flow expressions are translated relative to the recipient's context. Unlike other context-based naming systems, this rule-based preference processing does not obscure the global meaning of names. Global names remain visible and usable to all. For this reason, recipients can easily use global names to specify that they want to delegate particular kinds of requests to someone else. Personal naming contexts 610 perform translations that are significant and appropriate to the recipient's context while supporting meaningful global names.

Thus, as shown in FIG. 6, the personal naming context 610 for Joann includes nodes corresponding to three communication flow rules, namely, a manager rule 630, a family rule 640 and a paperwork rule 650. Each recipient's personal naming context, such as the personal naming context 610 for recipient Joann, is established as a subtree rooted at their InetOrgPerson {RFC2798} or InetOrgRole object in the LDAP directory tree 600. The InetOrgPerson object is an LDAP standard object for describing contact information about people, and the InetOrgRole object is a subclass of the LDAP standard object class OrgRole {RFC2256}. For example, in FIG. 6, Joann's personal naming context 610 is rooted at the InetOrgPerson node labeled "UTID=joann."

Each personal naming context 610 can have three types of objects that are relevant to communication flow expression processing: communication flow rules, named communication flow expressions, and media contact objects. In FIG. 6, the topmost three entries 630, 640, 650 in the personal naming context 610 represent three communication flow rules with the names: MgrRule, FamilyRule and PaperwrkR. The nodes 660, 670, 680 correspond to three media contact objects with the names: web, cell and email, respectively. The nodes 690, 695 correspond to two named communication flow expressions: UrgentCF and RelaxedCF.

The communication flow rules, such as the manager rule 630, family rule 640 and paperwork rule 650 specified by Joann would be defined in the recipient preference and role database 500. The corresponding objects from the recipient preference and role database 500 that defines the manager rule 630, family rule 640 and paperwork rule 650 are shown in FIG. 7. Specifically, the recipient preference and role database 500 includes a record 710 that defines the manager rule 630, a record 720 that defines the family rule 640, and a record 730 that defines the paperwork rule 650.

Each communication flow rule, such as those shown in FIG. 7, includes the following four attributes: active, order, condition, and communication flow expression. Active is set to "yes" or "no." Rules that are inactive, i.e., set to "no", are not considered when translating the recipient's name to a personal communication flow. The order attribute is used to order all the active rules in the recipient's naming context 610 for evaluation. The condition of each rule in the order is tested in turn. The conditions are logical expressions comprised of attribute value comparisons, such as equality, inequality, range, and regular expression matching. Once a condition is satisfied, the recipient's name is translated to the accompanying communication flow expression for the purpose of delivering the request. The condition for MgrRule tests for specific requesters by username or uid. The condition for FamilyRule tests for titles that start with "Family." The condition for PaperwrkR is always satisfied. PaperwrkR is the default rule applied when no other rule is satisfied. For this reason, its order number is the highest number.

As shown in FIG. 7, each of the exemplary rules in records 710, 720 and 730 reference at least one named communication flow expression (urgentCF 690 or relaxedCF 695). The urgentCF or relaxedCF communication flow expressions can be defined as named communication flow expressions in the recipient preference and role database 500, as follows:

UrgentCF: cell races officephone races homephone

RelaxedCF: email races web.

In this manner, the named communication flow expressions allow the recipient, Joann, to establish various rules for being contacted, based on the conditions specified in the rule.

When constructing rules, it is often useful to create named communication flow expressions for common methods of contact. In this manner, a recipient can update a particular preference in a named communication flow expression once, and all the communication flow rules that reference the changed named communication flow expression are automatically updated. The rules can then refer to the named flows, sometimes using the same named communication flow for a variety of purposes. The rule, PaperwrkR, simply uses a named communication flow (relaxedCF 695). The rule, MgrRule, places temporal constraints on when the recipient can be contacted urgently, and uses the relaxed contact communication flow at all times. The rule, FamilyRule, uses all available media contacts.

Communication flow rules also allow enterprise employees to provide an urgent response with escalation. For example, assume an enterprise must immediately respond to a request from a customer, and a request is received from the customer with a title including the keywords "urgent business." Assume further that at least one employee of the enterprise has specified the following communication flow rule:

Title="*Urgent Business*";
Communication flow: (cellphone races pager) before+0:05 delegates manager The "manager" is a default named communication flow that uses the manager link in the recipient's directory entry to find the correct manager. The escalation rule will be triggered when a request is received with a title including the keywords "urgent business." If the employee does not answer his or her cell phone or page within five (5) minutes, the request is escalated to the "manager."

Typically, communication flows that achieve an escalation employ the delegates primitive, where a request is cancelled before it is escalated to the next level. In a further variation, a communication flow can achieve escalation without canceling outstanding requests to earlier people in the chain. For example, the following exemplary communication flow achieves escalation without canceling outstanding requests to earlier people in the chain:

(Tom else Manager) races (Manager after+04:00).

This communication flow will initially contact Tom alone, and will contact the defined Manager immediately if the initial response is a failure. In addition, the request will be escalated to Manager after four (4) hours and only the first response from Tom or Manager will be accepted. It is noted that the notification and response system 100 can optionally maintain information about why a given request is cancelled and can provide such information to the recipient associated with a cancelled request.

In this communication flow expression, optimization is used to contact Manager once despite the fact that the recipient named Manager may be active twice in the communication flow at the same time. Each instance of a recipient name is owned by the entity that contributed it to the request, i.e., by the requester, or a person or a role contributing a personal communication flow. If recipient names identify the same object/recipient and the owners of the recipient names are same, the recipient is only contacted once for those names. If the owners differ, the assumption is made that the recipient may want to act in different ways as the delegate of the owner, and so the recipient is contacted more than once with a note about who delegated the request to the recipient.

The user preferences recorded in the recipient preference and role database 500 and LDAP directory tree 600, and discussed above in conjunction with FIGS. 5-7, can be modified by presence and availability information. For example, a recipient can specify his or her preferences, as follows:

(present(cell) then cell) delegates (present(email) then email)

The present function contacts the presence server with the recipient and device information available for the cell media contact. If the presence server indicates that the cell phone is on, the present function returns "true." If not, it returns "maybe." Similarly, if the recipient is present on the network for the email media contact, the present function returns "true." If not, it returns "maybe." If the recipient is present on the cell phone, he or she is contacted via cell phone. If the recipient is not present or if the contact fails, then the network is checked and email is sent if the recipient is present there. The present function can be more or less sophisticated depending on the features offered by the presence server. Note also that the communication flow rules allow the recipients to limit which requesters or types of request have access to them through the presence server.

In another application of presence and availability information, a media contact can optimize its behavior by skipping communication attempts (e.g., phone calls) that presence information indicates will fail (e.g., cell phone is off). The media contact can simply proceed as if the attempted phone call failed.

The user preferences can also be determined by the enterprise. For example, an enterprise can send notices to a customer with an increasing degree of invasiveness, based on the customer's payment history. For example, as discussed further below in a discussion of the "delegates" primitive, customers with poor payment histories can receive the first overdue notice by automated telephone call and the second notice through a collection agency. Customers with average payment histories can receive the first overdue notice by postal service, the second notice by automated telephone call and the third notice through a collection agency.

Directory Defaults and Heuristics

The communication flow manager 1300, discussed further below in conjunction with FIG. 13, employs default directories in the LDAP directory tree 600 (FIG. 6) for faster installation and ease of use. The communication flow manager 1300 also enhances ease of use by employing heuristics when searching the directory. When the communication flow manager 1300 is first installed at an enterprise, the communication flow manager 1300 will run off of an existing enterprise LDAP directory 500. In addition to information about the configuration of the enterprise LDAP directory 500, the communication flow manager 1300 requires the creation of object classes for its application specific objects (i.e., communication flows, communication flow rules, media contact, enhanced role and configuration objects).

The communication flow manager 1300 also requires the creation of a directory subtree 600 where it can store its configuration and default instances of its other objects. The default directories are used to provide communication flow services to the people and roles that already exist in the enterprise directory. These people and roles can be enhanced with personalized communication flows and rules at the discretion of the recipients and their enterprise.

The default instances of the media contact objects use a substitution facility that is also available to users who specify their own media contact objects. The address field in the media contact object can use angle brackets to specify the name of an attribute in the intended recipient's LDAP directory entry. The value of that attribute, if it exists, replaces the angle-bracketed attribute name in the address field on retrieval of the object. For example, <mobile> fills the media contact object address field with the value of mobile in the inetOrgPerson object that describes the intended recipient, Joann. More sophisticated substitution techniques are also possible and within the scope of the present invention.

Along with the default instances of the media contact objects, the communication flow manager 1300 creates a default named communication flow expression and a default communication flow rule. In an exemplary notification and response system 100, the default is to send every request to the recipient's email account and web portal: email races web. All of the defaults can be changed by the enterprise to fit its needs, and the default objects are available to users who are constructing their personal communication flow expressions and communication flow rules.

The full distinguished names of entries can be cumbersome and non-intuitive. Thus, the communication flow manager 1300 uses a heuristic search on short names to locate the objects it needs. The full distinguished name of an object is specified by enclosing the distinguished name in angle brackets in a communication flow expression, e.g., <uid=joann, ou=people, o=research.avaya.com>. The short names have been used exclusively in examples herein.

When a name is encountered, the communication flow manager 1300 searches the directory subtree(s), e.g., 610, 620, used to store information about people, roles, named communication flows or personal naming contexts, as appropriate. The communication flow manager 1300 searches by comparing the short name to the relative distinguished names of entries in the subtree. If no match is found, the communication flow manager 1300 will then search its default directory before returning an error.

Other parts of an enterprise or other enterprises can be contacted via the local communication flow manager 1300 even if the external organizations have not installed a communication flow manager. If the external organization has an LDAP directory 500, it can be incorporated into the name space of the communication flow manager 1300 in two ways. First, a "smart referral" or other mechanism that chains to outside directories for responses is used to incorporate the external directory into the local directory. In this case, the communication flow defaults for the local directory are applied to the external directory whenever defaults or personal communication flow information is not available there. Second, the adv_search primitive allows contact information for any external directory to be described and used by a requester. In all cases where defaults are needed, the local defaults are used unless the name of the directory subtree that stores defaults and configuration for the communication flow manager 1300 in the external directory matches the suggested convention of the communication flow manager 1300. For this reason, it is recommended that LDAP directories support the recommended subtree name for the communication flow manager 1300. In the exemplary notification and response system 100, that name is:

<ou=Xui Server, o=domain-name-of-server>.

Requesters sometimes have address books of individuals that they wish to contact who are not in the directory. Sometimes, requesters have a strong preference for contacting specific individuals by a particular media type, such as a telephone. In these cases, requesters can create personal naming contexts for these individuals within the requester's personal naming context in the directory. Each personal naming context for another person includes an inetOrgPerson entry for that person, and then communication flow rules, media contacts, and named communication flows in the subtree rooted at that inetOrgPerson entry. The requester then specifies full distinguished names for each of these recipients in the communication flow for his/her requests.

The communication flow manager 1300 will use the communication flows specified by the requester 110 for the recipient. An enhancement of the system would extend the algorithm for searching for defaults to look first within the requester's tree for short names, and then through the people and roles subtrees of the directory, and finally in the default subtrees of the directory. These techniques are at odds with recipients' specification of their preferences, so they should only be used for recipients who are not listed in the directory or for applications where the preferences of the recipient are irrelevant or need not be obeyed.

Communication Flow Primitives

As previously indicated, communication flow expressions specify the recipients that shall receive a request and how, when and where the recipients shall receive the request. The primitives included in a communication flow expression specify whether to contact the recipients simultaneously or sequentially, and when execution of the sub-expression should terminate by defining a logical combination of success test results. FIG. 8 is a sample table indicating a set of exemplary communication flow expression primitives. FIGS. 9A through 9E illustrate the truth tables for various primitives indicated in FIG. 8. In FIGS. 9A through 9E, "F" indicates a false response, "T" indicates a true response and "X" indicates a maybe response. The left column in each of FIGS. 9A through 9E indicates the first operand to respond and the top row indicates the second operand to respond (for all primitives other than the single operand "not" primitive). A "b" subscript on a T, X or F, indicates that both operands must be evaluated to get the indicated value. Primitives direct the flow of requests to recipients. More specifically, primitives combine directions for parallel or sequential communication with an evaluation of how the status of communication with a recipient affects the communication flow. Other primitives control when contact is made or how to construct a communication flow from lists of objects in the directory.

The primitives can naturally be grouped into parallel/sequential pairs, as follows: and/then, or/else, races/delegates, and votes/polls. Parallel and sequential primitives differ in how the operands are evaluated. In parallel primitives, each recipient is contacted in parallel. Outstanding requests are canceled when they are no longer necessary to determine the truth value of the primitive. In sequential primitives, requests are made to each recipient in the order that they appear. When that recipient responds, a request is sent to the next recipient, if necessary, to determine the truth value of the primitive. Each primitive evaluates to true, false or maybe depending on the success of the communication with the recipients.

And/Then

The "and" primitive specifies that two recipients are contacted in parallel, and that the communication flow is successful (evaluates to true) when both recipients respond with success. If the request to one of the recipients fails, the "and" primitive evaluates to false and the request to the other recipient is cancelled if possible. In all other cases, the "and" primitive evaluates to maybe. The truth table for "and" is given in FIG. 9A, where the values for the first operand to respond are along the left for each row and the values for the second operand to respond are along the top for each column.

The "then" primitive is the sequential form of "and." In other words, the recipients are contacted one at a time in the order that they appear and the second recipient is contacted only if the first recipient responds with success. The truth table for the "then" primitive, shown in FIG. 9B, differs from the truth table for the "and" primitive when the first operand returns maybe and the second operand would return false. The second operand is not evaluated in the case of the "then" primitive and the truth value of the "then" primitive remains maybe, while in the case of the "and" primitive, the second operand is evaluated and the primitive returns false. This choice was made for the "then" primitive to provide a more natural semantic interpretation.

Or/Else

The "or" primitive specifies that two recipients are contacted in parallel, and that the communication flow is successful (evaluates to true) if at least one recipient responds with success. If both recipients respond negatively, then the primitive evaluates to false. In all other cases, the primitive evaluates to maybe. The truth table for the "or" primitive is shown in FIG. 9C.

The "else" primitive is the sequential form of the "or" primitive, such that the second recipient is contacted only if the first response is not successful. The truth table for the "else" primitive is the same as that for the "or" primitive, shown in FIG. 9C. In the case of the "else" primitive, the second operand is only evaluated if the first operand evaluates to maybe or false. The "else" operator is provided to address the scenario where a second recipient is contacted only if the first recipient says "no" or fails to respond (maybe).

Races/Delegates

The and/then, or/else primitives are all focused on contacting enough recipients to determine the success or failure of a communication flow expression. Sometimes, it is also useful to accept the first of many possible responses. This is not possible with the existing primitives, because they count votes until success is achieved or made impossible. The parallel primitive "races" succeeds or fails according to the status of the first of its operands to respond. If the first respondent succeeds, the "races" primitive succeeds. If the first respondent fails, the "races" primitive fails. The request to the second respondent is cancelled if possible. For example, Cell races Office races Email races Web succeeds or fails according to the first response received from a recipient via any of the following media contacts: cell phone, office phone, email or web portal.

Unlike the other primitives discussed herein, the "races" primitive provides equal weight to a success or a failure response from one operand. The and/then primitives respond immediately to the failure of an operand, but waits for results from both operands before returning success. The or/else primitives respond immediately to the success of an operand, but waits for both operands before returning failure. The "races" primitive responds immediately to the first response from an operand, and returns the result of that operand. It is particularly useful, as shown in the above example, for contacting an individual via multiple devices and allowing the individual to answer the request with success or failure via just one of those devices. The "races" primitive cannot be specified by the other primitives. The truth table for RACES is given in FIG. 9D.

The "delegates" primitive is the sequential form of the "races" primitive. The truth table for the "delegates" primitive is the same as that for the "races" primitive. The "delegates" primitive only evaluates the right operand if the left operand returns notification failure (maybe). Like the "races" primitive, the "delegates" primitive cannot be specified by the other primitives.

Returning to the example discussed above, Joann can specify her preferences as:

cell delegates office delegates Jerry while the generator of the request specifies:

(Joann then Tom) or (Joann else Priya)

Jerry only responds if Joann fails to respond. Tom is only contacted if Joann or Jerry, in Joann's absence, say "Yes." If neither Joann nor Jerry responds, or both say "No," Priya is contacted.

The "races" primitive was motivated by the need to contact one person via multiple, simultaneous devices. For example, a recipient might specify that a notification should be sent to both her cell phone and office phone. To be able to specify that if the recipient responded via her office phone, then that response, whether success or failure, should also apply to the pending contact to the cell phone. The "and" and "or" primitives did not satisfy this requirement. The "delegate" primitive addresses, e.g., the scenario where a second recipient is contacted only if the first recipient does not respond or a series of devices is searched sequentially until contact is made with the recipient.

As previously indicated, the delegates primitive allows an enterprise to provide personalized request delivery with escalation. For example, an enterprise involved in bill collection can provide personal communication flows for each customer based on a relationship history with the customer, as follows:

good credit customers: web delegates email delegates sms delegates homephone poor credit customers: homephone delegates officephone delegates cell Thus, as a customer fails to respond to each request, the request is escalated to the next contact method.

Votes/Polls

It is possible to generalize the sequential and parallel communication flow primitives for lists of recipients. The parallel and sequential forms of the and/or primitives are special cases of two more general primitives that allow parallel or sequential voting by a list of recipients. For example, the successful "and" primitives are votes by two recipients where 100% vote yes, and successful "or" primitives are votes by two recipients where at least 50% vote yes.

A "votes" primitive contacts a list of a number, c, of recipients in parallel and returns success (true) if a count, m, or percentage, n %, of success responses is reached. Thus, failure occurs if there are c-m+1 false responses. Each recipient can be a communication flow expression, and the count or percentage represents the number of successes that must be received for the "votes" primitive to succeed. For example, {Tom, Joann, Jerry} votes 50% contacts Tom, Joann and Jerry in parallel. If at least two respond with success, the "votes" primitive results in success. The "votes" primitive fails (returns false) when enough recipients return false responses to prevent the specified count or percentage from being reached. In the other cases, where success cannot be reached, the "votes" primitive results in maybe. In the above example, if at least two of Tom, Joann and Jerry respond with failure, the "votes" primitive results in failure. On the other hand, a true, a false and a maybe result in a truth value of maybe.

It is noted that it is possible to calculate the number of true votes required to return true directly from the count or percentage in the primitive. From this, it is a simple matter to calculate the number of false votes required to return false (total count+1−number for true), and the number of non-true votes (false or maybe where at least one is maybe) to return maybe (total count+1−number for true). The "polls" primitive is the sequential form of the "votes "primitive.

The votes primitive can be used advantageously, for example, to sell or distribute a limited number of items. For example, a company that has 500 units of a given item and 5000 possible customers can specify the following communication flow:

{customer1, customer2, . . . , customer5000} votes 500

This request will complete when customers have ordered 500 units (assumes each customer only orders one unit). For a discussion of an example where each customer can order more than one unit, see the discussion below on test response status primitives.

The polls primitive can be used advantageously, for example, to fill an urgent workforce need. For example, a school looking to find five (5) substitute teachers from an ordered list by tomorrow morning, can specify a communication flow as follows:

{teacher1, teacher2, . . . , teacherN} polls 5

As previously indicated, this request will complete when 5 substitutes teachers agree to teach.

Since communication flow expressions are not lists, it is useful to convert expressions to the lists required by the "votes" and "polls" primitives. In particular, the named communication flows in the recipient preference and role database 500 often naturally have a list structure. Automatic conversion is supported for the "votes" and "polls" primitives when communication flow expressions, rather than lists in brackets, appear as their first operands. The automatic conversion is done for communication flow expressions that contain only conjunctions or only disjunctions. If an expression contains only "and" and "then" primitives, it is converted to a list of its conjuncts. If an expression contains only "or" and "else" primitives, the expression is converted to a list of its disjuncts. Revisiting an example given above, Reviewers votes 2 is actually the expression:

(Chris and Jerry and Benji and Jenny) votes 2

The conjunction is converted to the list {Chris, Jerry, Benji, Jenny} automatically. While it is possible to specify the details of converting any expression to a list, it is not clear that such conversions are necessary, clear or desirable. The search primitives, discussed below, convert lists to expressions.

Generalizing the "Races" and "Delegates" Primitives

It is possible to generalize the races and delegates primitives for lists of recipients. The generalization of races, called gen_races, accepts a list of recipients, the number of responses to collect and a decision algorithm for determining the success or failure of the primitive from the responses received. For example, one use of gen_races is to accept the value of the Nth response received. This corresponds to the radio talk show model of accepting the response from the 100th caller. In another example, gen_races collects three of five responses and returns the majority response of the three. It is noted that this result is different from {A, B, C, D, E} votes 2 which waits for two successes. Gen_delegates is the generalization of the delegates primitive. Gen_delegates is similar to gen_races except that it contacts the recipients sequentially until the primitive is satisfied.

Implementing the Sequential/Parallel Primitives

The sequential and parallel primitives are implemented in the exemplary embodiment with a simple counting algorithm. Each primitive is described by the number of true responses required to return true and the number of false responses required to return false. It is further described by the minimum number of maybe responses required to return maybe and the total number of responses that must be received before maybe is returned. FIG. 10 summarizes the counts for each primitive where C is the count of all the recipients listed in votes/polls and X is the number of true responses required by the votes/polls percentage or count. Parallel and sequential primitives count the number of responses received in each class. Whenever the requirements for one of the status returns is reached, the primitives cancel outstanding requests and return the appropriate status.

Status Interpretation and Temporal Primitives

As discussed above in conjunction with FIG. 4, the success of a request to a recipient 120 involves notification success and response success. Notification success occurs when the recipient is contacted successfully. Response success, by default, occurs when a recipient responds in a way that satisfies the definition of success for the request and response system API. For the web API of the notification and response system 100, the default for response success is to reply to a web form without including the value of "false" or "no" for the submit button. A "false" or "no" for a submit button is the default response for response failure.

Some applications may require an application specific definition of response success. For example, if an expense report is to be approved by several managers in sequence, success can be defined as responding to a request with report_status="approved."

The Test Response Status primitive allows applications to provide a response success specification as a logical expression of comparisons of attribute-value pairs from the response. The logical expression is specified between question marks after the recipient whose response is to be tested. The comparisons can include equality, inequality, range and regular expression matching. In cases where the success specification is the same for all recipients in a communication flow, but different from the system default, a request-wide default can be supplied.

The following example specifies the response success status without using the default facility:

DepartmentHead? report_status="approved"? then Director? report_status="approved"? then VP? report_status="approved"?

When the Test Response Status primitive is applied to expressions containing multiple recipients, it is applied to each recipient in the more complicated expression. For example, the previous expression can also be written as:

(DepartmentHead then Director then VP)? report_status="approved"?

Success specifications can perform aggregation and other advanced processing on the attributes of the response over all responses so far and then test the results for success or failure.

As indicated above, the votes primitive can be used to sell or distribute a limited number of items, but assumes that each customer purchases exactly one unit. The following success expression allows each customer to order more than one unit and terminates notifications when at least 100 units have been sold:

(Sue or Fred or . . . or Sam)? sum (number_sold)$\geq$100?

After 100 have been sold, outstanding requests to other recipients are cancelled. When the notification offer is personalized with data available to the notification and response system, the results of the previous responses can be used to offer the recipients those items still available for sale (100−sum(number_sold)). If two recipients attempt to buy the remaining items, the first will succeed and the second will be told that the request has been cancelled (i.e. the offer withdrawn) because it was completed by another.

Between/Before/After

In addition to the primitive that tests the response status, the "between," "before" and "after" primitives specify the time constraints for delivering the notification and collecting the response from the recipient. A time constraint can specify the start time, as in the "after" primitive, or the end time, as in the "before" primitive or both, as in the "between" primitive. "Between x-y" can also be expressed as "after x before y." When multiple time constraints are applied to the same recipient, the time constraints are evaluated from left to right. The first time constraint establishes an effective start and end time. Subsequent time constraints may refine those times. Relative time constraints can adjust the times either forward or backwards. Other constraints, for example those involving finding the start or end of an interval, can move the start time forward and the end time backwards. In other words, if multiple primitives establish conflicting absolute start times or conflicting absolute end times, the later start time and the earlier end time are used effectively intersecting constraint intervals. When a temporal constraint primitive is applied to expressions containing multiple recipients, it is applied to each recipient in the more complicated expression.

Time constraints are specified using time expressions and time domain expressions. A time expression denotes a specific instant in time, and a time domain expression denotes a time domain. We first define time domain expressions, since these are used in writing time expressions. A time domain is one or more temporal intervals specified as (start time, end time), where the start time is within the interval and the end time is not. The basic time domain is Eternity which is conceptually one interval from the beginning (Creation) to the end of time (Armageddon). Creation is taken as an arbitrary start time (such as the epoch in Unix, 00:00.00 UTC on Jan. 1, 1970), and Armageddon is treated similarly. Currently, time is specified at the resolution of seconds since Creation. Every other time domain is a set of disjoint time intervals (start, end) where the start of the interval is closed and the end of the interval is open.

Time domains are closed under union, intersection and complement, which means that these operations on the domains always produce another valid domain. Time domain expressions are built from primitive time domains (defined below), and the operations of union, intersection, and complement. Just as communication flow expressions can be named and used in other communication flow expressions, time domain expressions can be named and used in other time domain expressions.

Primitive time domains include the following:

An interval with a specified start and end time, such as from 9:00.00, May 13, 2002 until 17:00.00, May 13, 2002.

Any given day, such as May 13, 2002.

Any given week, such as Sunday, May 12, 2002 through Saturday, May 18, 2002.

Any given month, such as May 2002.

Any given year, such as 2002.

Any given day of the week, such as Monday (meaning the union of all Mondays between Creation and Armageddon).

Any given month, such as May (meaning the union of all Mays between Creation and Armageddon).

Any given day of the year, such as July 4 (meaning the union of all July 4ths between Creation and Armageddon).

Any given time range, such as 9:00.00-17:00.00 (meaning the union of all such intervals on all days between Creation and Armageddon).

For example, one could define weekdays as the union of the given days Monday, Tuesday, Wednesday, Thursday, and Friday. One could define holidays as the union of January 1, July 4 and December 25. One could then define business hours to be the intersection of weekdays with the time range 9:00.00-17:00.00. One could further refine business hours by intersecting it with the complement of holidays.

Time expressions may specify an absolute time, or may specify a time that is computed in terms of a starting time (such as four hours from now) or may specify a time that is computed from a time domain and a starting time (such as, the beginning of the next business day; or four business hours from now, meaning four hours from now counting only within the business hour time domain).

Time expressions may take one of the following forms.

Any absolute time, such as 17:00.00 13 May 2002.

A relative time, such as +4:00.00, meaning four hours after the current time, or −3:00.00, meaning three hours before the current time.

The start or end of the next interval within a time domain, for instance, the next close of business can be specified as the next end of an interval within business hours after the current time. More generally, one can count starts or ends, for instance, the second close of business.

A time elapsed within a given time domain, for instance, if it is now 16:00.00 on 13 May 2002, elapsing four business hours yields 12:00.00 on 14 May 2002.

One can also move backward from the current time; this is particularly useful after having moved forward. For instance, one can define a time domain for the next vacation, and then refer to four business hours before the beginning of the next vacation.

More complicated time expressions can be defined in terms of these.

For example, one can define a (empty) time interval lasting from 12:00.00 to 12:00.00 each day. Taking the next start (or end) of such an interval gives noon on the next day. Using intersection with weekdays, we could similarly calculate noon on the next business day. Combining this with the operator that counts ends of intervals, we can compute close of business two days after noon on the next business day.

As another example, one might specify business hours in Spain as the union of the ranges 9:00.00-12:00.00 and 14:00.00-19:00.00. To find close of business on the current day, one intersects Spanish business hours with the current day and then finds the last end of interval within the resulting time domain.

The enterprise can define default time domain objects for the communication flow manager or each recipient can define their own personal time domain objects. One exemplary use of such objects is to define the business hours for an enterprise. The object contains:

Common name (cn) of the time domain object: business.

Directory filter for which recipients use the domain. This can be used to associate this business time domain with people in a specific company, timezone, or geographic area.

Timezone to use for calculating the effective times.

A time domain expression for the intervals in the domain. This time domain expression can reference other basic or named time domains.

The time domain is used with the temporal expression operators "end of", "start of", "n end of," "n start of," where n is a count or the keyword last, "+" a relative time within the domain, "−" a relative time within the domain in the "before," "after," and "between" primitives, for example:

AFTER end of business

BEFORE 2 start of business

BETWEEN start of business−end of business

BEFORE business+4:00.00

AFTER end of business AFTER business−01:00.00

AFTER last end of (SpanishBusinessHours intersect Today)

Various simplifications can be made to make the syntax even more natural. For example, if the name of a time domain follows after, one could take the next end of an interval in that time domain to be the designated time. Similarly for before, one can take the next start of interval in the time domain to be the designated time. This simplifies "AFTER end of business" to "AFTER BUSINESS," and "BEFORE start of Monday" to be "BEFORE Monday." This also simplifies "BETWEEN end of 08:00.00-start of 17:00.00" to be "BETWEEN 08:00.00–17:00.00." A full time domain expression that uses union, intersection and complement on existing time domains can also be used in places where the name of a time domain is used.

The standard default processing of the communication flow manager is applied to resolving a time domain name with two provisos: the common name of the time domain object starts with the name specified in the communication flow but can also include other qualifications after the dollar character "$", as in business$west-coast, and the recipient must match the filter in the time domain object. If several matching objects are found, one of the objects is chosen, if possible the object with the logically most specific filter (the filter that implies all the other matching filters) or, if that is not possible, an arbitrarily chosen one of the matching objects. The communication flow manager first looks in the context of the inetOrgPerson or inetrole object for a time domain of the given name with a matching filter. If none is found, the communication flow manager looks for the domain in its default directory.

Short Names and Directory Search Primitives

The examples discussed herein show that requesters 110 can specify recipients 120 using short names. As discussed below in a section entitled "Directory Defaults and Heuristics," these short names are translated by a heuristic search of the recipient preference and role database 500. Requesters 110 can also specify the full distinguished name of a recipient 120 in angle brackets, e.g., <uid=joann,ou=people, o=research.avaya.com>. Specifying the distinguished names for recipients 120 can be difficult for users, because it requires them to know the structure of the LDAP name tree 600 (FIG. 6). Communication flow expressions also support search operations, so users can describe the attributes of one or more recipient objects in the recipient preference and role database 500. When users employ search operations, they do not need to know the distinguished names of directory objects. An exemplary search primitive, having a format such as "search (filter, pattern, op)," searches the recipient preference and role database 500 for person, role or named communication flow objects matching the specified filter. An exemplary advanced search primitive, has a format such as "adv_search (directory-server, directory-port, base, scope, filter, pattern, op)." The operation of the filter, pattern and op parameters of the advanced search primitive is the same as the search primitive. The directory-server parameter specifies the domain name of the host of the recipient preference and role database 500 to search, and the directory-port parameter specifies the port number of the recipient preference and role database 500 server on that host. The directory tree rooted at the distinguished name in base is searched on the server. The scope of the search is either base (for the object identified by base only), one-level (for searching only the children of the object identified by base), or subtree (for searching the whole sub-tree of the object identified by base). Directory-server, directory-port, base or scope can be NULL, in which case defaults are applied.

Generally, the search primitives for communication flow expressions include a macro facility for processing the results of the search. Each object returned is substituted into a pattern, given in the pattern parameter of the search primitives, for the token "<dn>". The result string for this object is then connected to the result strings for other objects with a user-specified primitive, given in the op parameter of the search primitives, for example, "and" or "races." For example, the pattern:

(<dn> between May 01, 2001-May 08, 2001) delegates
(<dn> between May 08, 2001-May 10, 2001)

creates a string for notifying each recipient of a request once after May 1, 2001 and again after May 8, 2001 if no response is received. If a response is required from every recipient before the completion of a request, the result strings would be connected by the "and" primitive to produce a communication flow expression. The user also can restrict a search to returning only one recipient, as would be apparent to a person of ordinary skill in the art. Specifying how to handle multiple matches to a search protects users from unwittingly sending a sensitive request to a large group when they only intended to send it to an individual.

The search primitives can be used, e.g., to obtain expert assistance. For example, if a requester needs information from an expert on a given topic, such as J2EE, the requester can specify the following communication flow:
search ("&((objectclass=inetOrgPerson) (expertise=J2EE))", "<dn>", OR)

Alternatively, the communication flow can be specified as follows:
expert1 or expert . . . or expertN In a further example, a network alarm is raised and must be resolved by an expert. The requester can specify the following communication flow:
search ("&((objectclass=inetOrgPerson) (expertise=netmgr))", "<dn>", OR)

These requests will complete when one expert satisfactorily satisfies the request.

The following table lists an exemplary precedence of the operators (order of operations) from high to low. Operators at the same level associate from left to right. In general, parentheses can be used to change the order of precedence.

| Operator |
| --- |
| AND, THEN |
| OR, ELSE |
| RACES, |
| DELEGATES |
| NOT |
| VOTES, |
| POLLS |
| AFTER, |
| BEFORE, |
| BETWEEN |
| ? |
| SEARCH and other functions |

Request Manager 1200 and Communication Flow Manager 1300 Interaction

Figure 11:
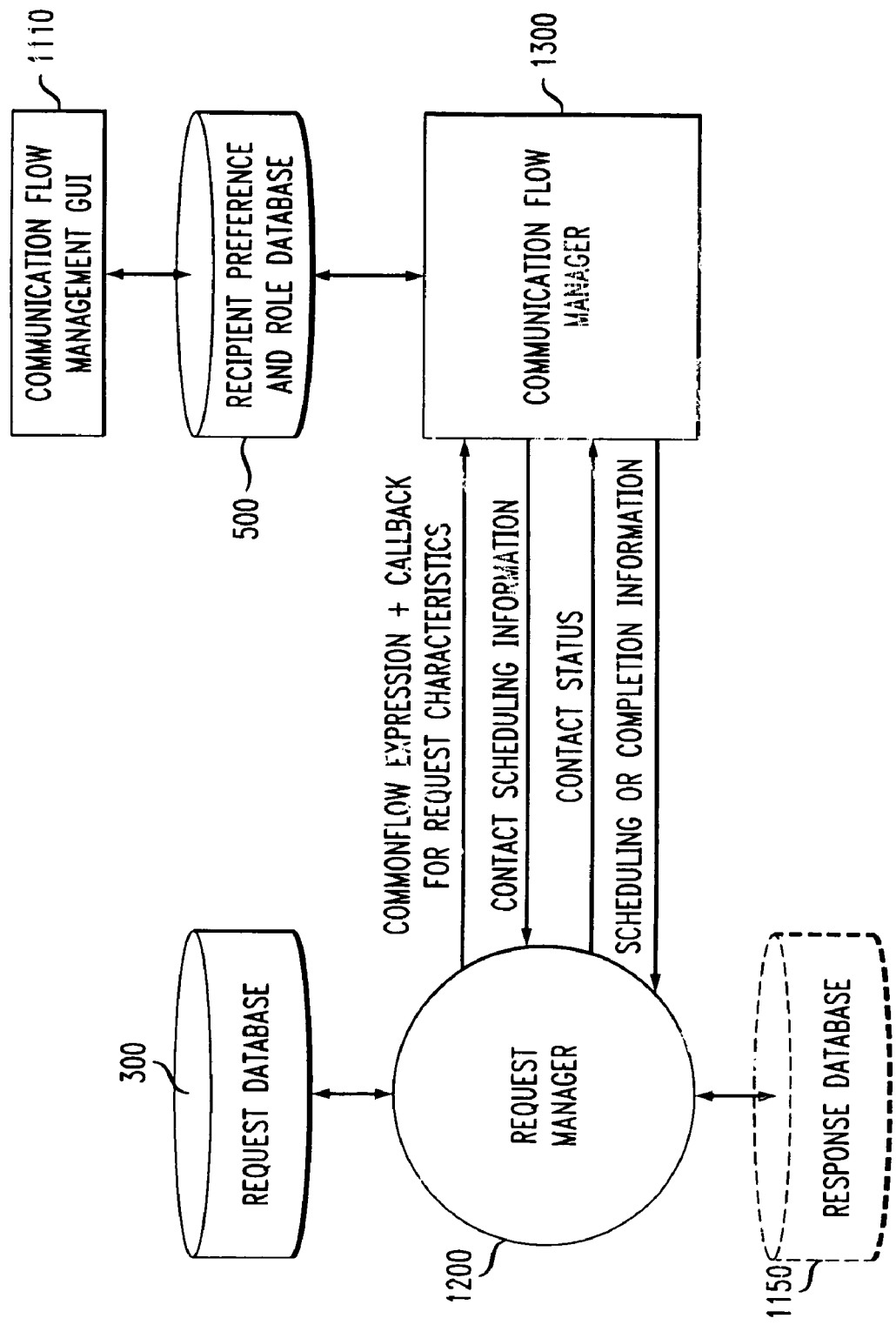
FIG. 11 illustrates the interaction between the request manager and communication flow manager shown in FIG. 2.
Figure 12A:
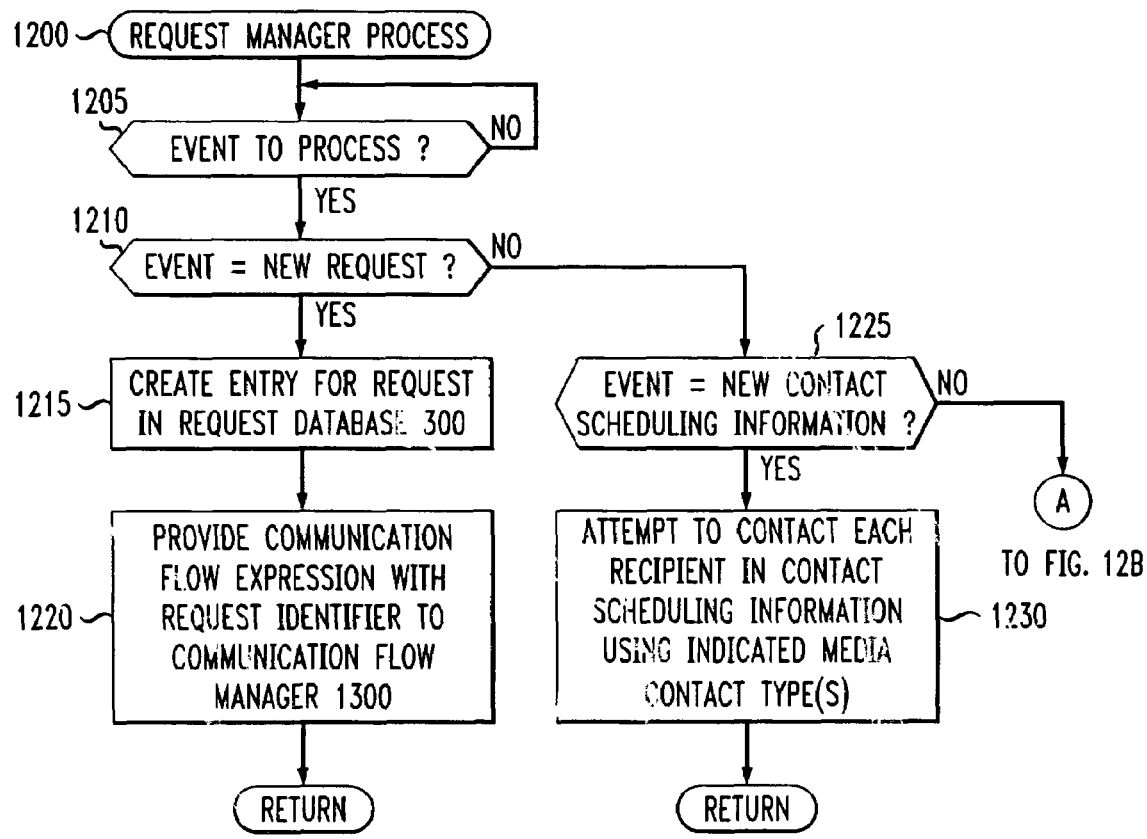
FIGS. 12A and 12B, collectively, are a flow chart illustrating the operation of the request manager of FIG. 11 in further detail.
Figure 12B:
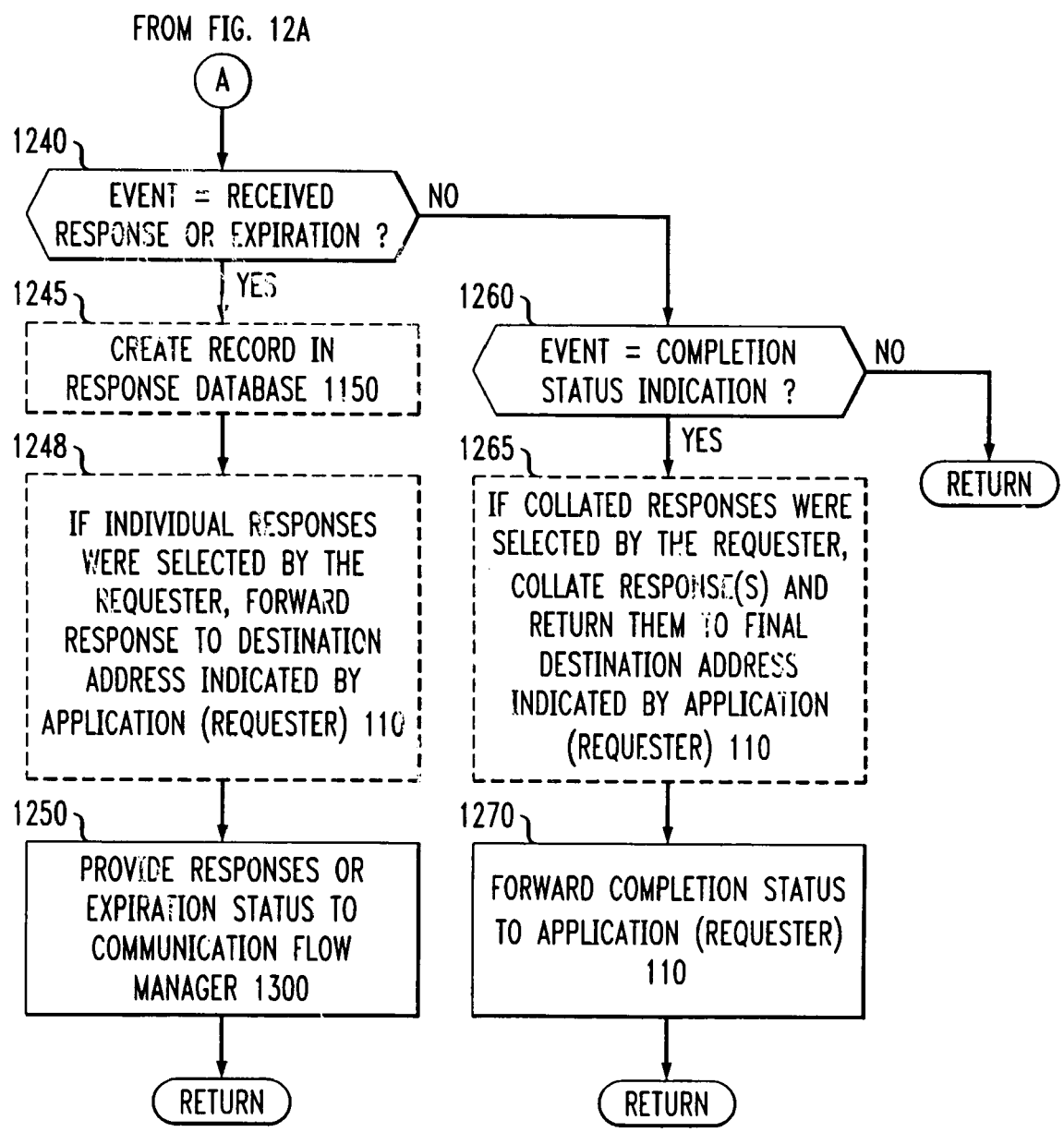
Figure 13:
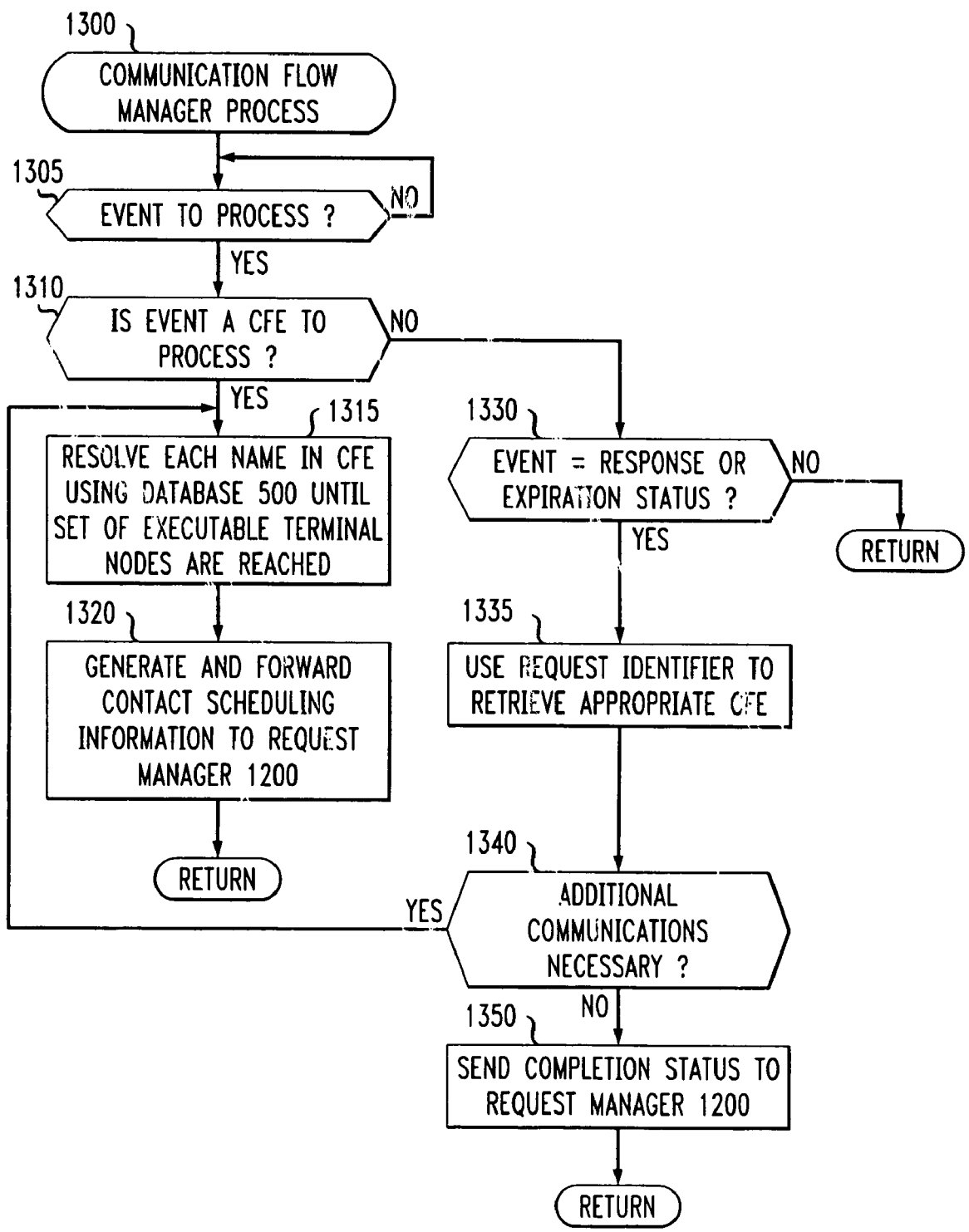
FIG. 13 is a flow chart illustrating the operation of the communication flow manager of FIG. 11 in further detail.

FIGS. 11 through 13 illustrate the interaction between the request manager 1200 and the communication flow manager 1300. FIG. 11 is a schematic block diagram illustrating the flow of information between the various entities associated with a request. FIGS. 12A and 12B, collectively, are a flow chart illustrating the operation of the request manager of FIG. 11 in further detail. FIG. 13 is a flow chart illustrating the operation of the communication flow manager of FIG. 11 in further detail. In the exemplary embodiment, the request manager process 1200 and communication flow manager process 1300 process various predefined asynchronous events that are detected during steps 1205 (FIG. 12) and 1305 (FIG. 13), respectively.

As shown in FIG. 12A, the request manager 1200 detects a new request received from an application 110 through an application interface 220 during step 1210. The request manager 1200 then creates an entry for the request in the request database 300 (FIG. 3) during step 1215, and provides the communication flow expression portion of the request, together with the request identifier, to the communication flow manager 1300 for parsing during step 1220.

As shown in FIG. 13, the communication flow manager 1300 detects a new communication flow expression to process during step 1310. The communication flow manager 1300 processes the communication flow expression during step 1315, as necessary, and continues resolving each name in the communication flow expression using the recipient preference and role database 500, until a set of executable terminal nodes in the tree 600 are reached, indicating the media contact objects to employ for a given recipient. It is noted that recipients 120 can enter and update their preferences in the recipient preference and role database 500 using a communication flow management GUI 1110.

The communication flow manager 1300 generates a list of devices to contact and returns the list to the request manager 1200 as part of the contact scheduling information during step 1325. Generally, the contact scheduling information includes only those contacts that are immediately schedulable by the request manager 1200. For example, if the preferences of a given recipient indicate that the recipient may only be reached by telephone between the hours of 8 am and 5 pm, then the communication flow manager 1300 would not schedule a telephone media contact until that time window is valid.

More specifically, the communication flow manager 1300 parses the received communication flow expression into a tree and begins recursively processing the nodes in the tree, for example, by walking the tree using a depth-first search approach, until a terminal node is reached. Each time a terminal (leaf) node is encountered in the tree, the media contact stored therein is processed. If a given node includes a parallel primitive, all nodes associated with operands of the parallel primitive are processed. If a given node includes a sequential primitive, a right-side operand is not processed until the left operand is completed.

Furthermore, before returning a media contact to the request manager 1200, the communication flow manager 1300 determines if the time constraints associated with the media contact (terminal node) are satisfied. For example, the communication flow manager 1300 determines if the start time has been reached. If all time constraints are satisfied, then the media contact is included in the list returned to the request manager 1200. If all the time constraints are not satisfied, then the media contact is not yet included in the list returned to the request manager 1200 and the communication flow manager 1300 sets a timer so the media contact can be added to the list by the communication flow manager 1300 at the appropriate time. It is noted that the media contact object is not retrieved until all time constraints are satisfied.

It is noted that the tree representation of the communication flow expression can include back pointers to the root node in a known manner to facilitate the identification of relevant time constraints. If a named node for a person or role is encountered in the tree, a determination is made as to whether the name has been previously contacted with the same owner (same specified communication flow). If the name has been previously contacted with the same owner, then a second contact attempt is not made. Rather, status information is propagated from the previous contact.

As shown in FIG. 12A, the request manager 1200 detects the received contact scheduling information during step 1225 and attempts to contact each recipient indicated in the contact scheduling information using the indicated media contact type(s) during step 1230, as discussed below in a section entitled "Media Specific Interfaces."

If the request manager 1200 detects one or more responses or message expiration events during step 1240 (FIG. 12B), a record of the responses or expirations with the corresponding request identifier is optionally created in a response database 1150, for example, during step 1245 for archival or record keeping purposes. In an embodiment where each individual response is provided to the requesting applications 110, the received response is forwarded to the corresponding application 110 during step 1248. The responses or expiration status are forwarded to the communication flow manager 1300 for further processing during step 1250.

The communication flow manager 1300 detects the received response or expiration status with the request identifier during step 1330, and uses the request identifier to retrieve the appropriate communication flow expression during step 1335. When a response or expiration status is detected during step 1330, the communication flow manager also updates the tree representation of the communication flow expression during step 1335 to reflect the status of the media contact. The communication flow manager 1300 then propagates the status upwards to the root of the tree by determining the status of any superior operand that is now determined, and hence the operand is now complete, as a result of the status of the media contact. When an operand completes, outstanding media contacts for that operand are placed in a list of contacts to cancel. This list is returned to the Request Manager 1200 after step 1350 or 1320 as appropriate. If the propagation of status does not result in the overall completion of the communication flow, which occurs when the completion status of the highest operator in the tree is set, processing continues with step 1315. If the overall communication flow is complete, processing continues with step 1350.

Using the communication flow expression, the communication flow manager 1300 determines if any additional communications are necessary or if the communication is complete. If it is determined during step 1340 that additional communications are necessary program control returns to step 1315 to generate the contact scheduling information and provide further contact scheduling information to the request manager 1200. If, however, it is determined during step 1340 that the communication flow expression is complete, then the communication flow manager 1300 forwards a completion status indication to the request manager 1200 during step 1350.

In an embodiment where collated responses are provided to the requesting applications 110, the request manager 1200 collates the responses and returns them to the final destination address indicated by the requesting application 110 during step 1265, once the request manager 1200 receives the completion status indication from the communication flow manager 1300 during step 1260. A completion status message is sent to the corresponding application during step 1270.

Media Specific Interfaces

In an exemplary implementation, media specific interfaces are all subclasses of a single abstract MediaContact class that requires each subclass to implement two methods, one to initiate a contact and another to cancel it. However, although only two methods are required, subclasses range from very simple to quite complex, depending to some extent on the distribution of intelligence between the notification and response system 100 and the endpoints. Generally, for each media contact, the request is transcoded by one of the media specific transcoders discussed below to produce an encoding suitable for the particular contact to be attempted. A protocol specific communication interface handles the actual delivery of the encoded requests to each recipient.

This collection of classes can be thought of as a device abstraction layer. Such a device abstraction layer hides all the complexity of the various devices from the other notification and response system 100 classes and exposes only a few simple methods to instantiate, initiate and cancel a notification as well as some parameter setting and getting methods that are uniform across all devices. In the following, a number of exemplary MediaContact subclasses are discussed.

WebContact

The WebContact class allows a recipient to log into a web portal to see lists of pending, completed and cancelled requests. The WebContact class simply inserts an item containing the name of the requester, the time of the request, the subject and a hyperlink to the request URL into the pending list. Cancellation just moves the item from the pending to the cancelled list. The "recipient" responds by clicking on the desired notification and then completing the form that is displayed.

PhoneContact

The PhoneContact class must initiate a telephone call rather than waiting until the recipients calls or contacts it. In addition, the PhoneContact class can employ a Voice extensible Markup Language (VoiceXML) system that produces an audio rendering of an VXML script (or another textual representation). The PhoneContact class sends a message to an automated telephone dialer via TCP specifying the request identifier, the media contact identifier, the telephone number to be dialed and the URL of a servlet that will return a VXML script for the target recipient. In case of a cancellation, PhoneContact simply sends a message directing that the phone call be cancelled if it has not already been placed.

The automated telephone dialer's control program queues the requests for phone calls and executes them in FIFO order as soon as resources become available.

EmailContact

The exemplary notification and response system 100 allows for three different types of email: plain text, HTML and embedded dynamic HTML. In the first case, many recipients sometimes use text-only email clients. This includes not only text editor emacs and some web-based clients, but also wireless email clients, such as those commercially available from Blackberry™ and Palm™. In this case, which must be provisioned by indicating in the directory that email should be text only, the notification and response system 100 constructs a simple email message that usually contains the name of the requester, the subject of the request and a URL that points to the notification message. In an exemplary implementation, the requesting application created the text message itself and also inserted the phone number of the voice portal that could be called for audio access.

For an HMTL capable email client that is not able to handle embedded frames or layers, the EmailContact constructs an HTML page that again describes the notification but this time contains a hyperlink to the notification message. For an email client able to handle embedded frames and layers, the EmailContact constructs a message that embeds the notification so that the contents will be incorporated when the client renders the message.

One final complication for the EmailContact was the necessity to interpret email messages that cannot be delivered. This is implemented by providing a main method that is, in turn, specified as the program to handle any messages sent to the notification and response system 100. This method then attempts to interpret the returned mail to determine whether it indicates that the delivery attempt failed or something else. If so, then the notification and response system 100 is informed that the contact failed. The notification and response system 100 can optionally read receipt requests and interpret them. This would make it possible to determine that a notification had succeeded even if no reply is sent and may be a necessary capability for some applications.

SMSContact

SMSContact handles notifications via the Short Messaging Service that is available from many cell phone providers including Sprint™, Verizon™ and AT&T™. The SMSContact object does a provider specific HTTP POST or GET to a web site to send the message. Although it is possible to do roughly the same thing by sending email to the service provider, the POST provides a bit more control. The POST carries the expense of software changes when the provider web interface evolves. The notification and response system 100 can optionally interpret the confirmation email that most service providers send out once the message has been delivered. In addition to identifying when an SMS message has been successfully sent, this email will permit a determination of whether the service provider web interface has changed so the system can fall back to using email SMS delivery until SMSContact software is upgraded.

FaxContact

The notification and response system 100 can provide a class to send a notification to a fax machine, for example, using the fax capabilities of Avaya's AUDIX systems. The class converts an HTML or text page into a TIFF image file and then generates a request to send the image via fax to the destination. The class also includes a simple status and management servlet that provides information on and some control of pending faxes.

AudixVoiceContact

The AudixVoiceContact object is designed to deliver the text version of a notification to a recipient's voice mailbox. An exemplary implementation is embodied using the ViaVoice™ product from IBM Corp. to render a message into an audio file that is then sent using essentially the same mechanism as FaxContact to an AUDIX server.

SIPContact

The SIPContact class connects the notification and response system 100 to SIP (Session Initiation Protocol) enabled end points. The Session Initiation Protocol (SIP), is described, for example, in M. Handley et al., "SIP: Session Initiation Protocol," RFC 2543, March 1999. SIP is a relatively new protocol defined by the Internet Engineering Taskforce (IETF) to setup and control a variety of communications sessions.

To do this, the SIPContact class relies on a component referred to as the SIP Execution Environment (SEE) that receives a message from the notification and response system 100. The message includes a SIP address for the recipient; a media contact identifier; a request identifier; and a list of available media types and human languages for this request. The SEE takes the SIP address and performs an "invite" on the address in accordance with the SIP protocol to establish contact with the recipient. The SEE then receives an OK message from the recipient device indicating the recipient's preferred media and human language. The SEE executes an XFS request, discussed below, supplying the media contact identifier; a request identifier; and preferred media type and human language for this request from the list previously supplied of those that are available. The XFS request returns the properly formatted content for notifying the recipient in accordance with the recipient's SIP preferences. This technique supports devices that prefer to receive multiple formats by allowing the SEE to call XFS once for each of the desired formats (some devices have screens and audio).

In an exemplary implementation, SEE can send an instant message or call to a Microsoft XP™ softphone; call (via a version of MultiVantage™ call processing software enhanced with SIP protocol support) SIP enabled Avaya 4624™ IP phones with their call control protocol changed to SIP (instead of H.323), digital and analog phones; send instant text messages to SIP enabled Avaya 4624™ IP phones with infrared capability and with their call control protocol changed to SIP (instead of H.323); and pop a web page on an experimental SIP enabled Avaya 4630™ IP screen phone with its call control protocol replaced by SIP (instead of H.323).

SIP complements the notification and response system 100 of the present invention in a number of ways. In particular, SIP provides a mechanism so that a recipient can set up his or her contact preferences on one server in such a way that these preferences apply to anyone contacting him or her. While SIP enabled recipients can express their preferences via SIP, traditional recipients can still define individual communications flows within the notification and response system 100. It is anticipated that SIP mechanisms will be used by recipients to control how and when notifications are received while communications flows within the notification and response system 100 will determine how and when notifications are sent to non-SIP endpoints and the SIP-specified preferred endpoints. That is, just as SIP and unified messaging provide control on how you receive messages, the notification and response system 100 will provide control over how an enterprise sends out those messages. It is noted that SIP control over how you receive messages can be enhanced with communication flow expression and communication flow rules functionality, in accordance with the disclosure herein.

The SIPContact class also demonstrates some of the advantages of the architecture of the notification and response system 100. In particular, the content of a notification message in the notification and response system 100 can be retrieved by a web or phone browser or a MediaContact by calling a form servlet referred to as XFS with two arguments that identified the request and the recipient and device being contacted:

http://xui/XFS?Rid=xui-1234-1 &Cid=1 where Rid is the request id and cid is the media contact id. The two together are sufficient to identify the recipient. XFS simply used the request manager 1200 to retrieve the appropriate request, which in turn, was used to obtain the URL of the notification message. This message was then retrieved, rewritten to redirect the response and personalize the message and then forwarded to the browser or other destination.

To support multiple language and media types, the XFS servlet can be modified to accept two additional parameters to specify the language and MIME type that was desired. For example, a more generic version of XFS allows retrieval of specific language and format types as follows:

http://xui/XFS?Rid=xui-1234-1&Cid=1&Ctype=text/plain&Language=ENU, which specifies that the English, plain text version of request "xui-1234-1" is needed.

The exemplary notification and response system 100 delivers a notification to the SIP enabled Avaya screen phone simultaneously in two ways, as a voice message via phone and a web page pop on the screen. This was done by having the screen phone specify to the SEE that it can handle both web pops and audio connections. The SEE then makes two calls to XFS, the first to retrieve the HTML page and the second to retrieve the VXML page:

http://xui/XFS?Rid=xui-1234-1&Cid=1&Ctype=text/html&Language=ENU;

http://xui/XFS?Rid=xui-1234-1&Cid=1&Ctype=textlvxml&Language=ENU.

EXEMPLARY EMBODIMENTS

As previously indicated, the notification and response system 100 allows an application 110 (the requester) to ask a question, specify the types of response desired, and receive a collated set of responses from recipients via email. FIG. 14 illustrates a web form 1400 that allows an application 110 to specify the parameters of a request for a team meeting. In the example of FIG. 14, Joann is sending a request to schedule a meeting to "YangQian" and "Petsche." If these recipients agree to the meeting time and place, then the request is forwarded to their manager (cmk) to see if he can also attend. The generated request is sent to the indicated recipients via different media contacts, as appropriate. The request includes a yes button and a no button for answering the request. FIG. 15 shows the compiled results of the request. As indicated in FIG. 15, Petsche could attend the meeting but YangQian could not attend the meeting, so their manager was not contacted.

In another example shown in FIG. 16, the requester offers shares of stock in block allotments on the IPO of a new company to preferred customers for a four-hour period. Temporal constraints are applied to a named communication flow, PreferredCustomers. PreferredCustomers translates to a parallel conjunction of recipients. The requester provides a series of options in the request to his/her best customers. The email version of the request, as received by each recipient defined by the named communication flow, PreferredCustomers, who has specified an email preference is shown in FIG. 17. Collated responses are returned as soon as all recipients respond or the four-hour period of the offer expires. If a recipient fails to respond in the four-hour period and then attempts to view or respond to the request, an appropriate message is displayed and the reply is neither solicited nor accepted.

Another exemplary embodiment of the present invention, referred to as "Reverse 911," allows the notification and response system 100 to provide an urgent 911 response. For example, communication flow expressions and rules can be defined to notify parents when there is an urgent problem at a school. In such a case, it is difficult for a school to marshal the necessary resources in an emergency that are required to contact the parent or guardian of each child in the school. The Reverse 911 system of the present invention provides an automated technique for contacting parents, and can also provide significant safeguards to prevent improper or fraudulent use and to minimize false alarms. The Reverse 911 system requires parents to register their preferences for being contacted in an emergency with a service provider. Once activated, the schools can use a web interface or electronic mail to initiate contact with all the parents in parallel. The notification can optionally include a button for the parents to acknowledge receipt of the message. In addition, the school can specify an approval process using the techniques described herein that must be satisfied before the notification is sent to the parents, and also enhance this security with other security features (e.g., secure login and access control to authenticate the requester). In this manner, the present invention can provide "human in the loop" security.

The same Reverse 911 system can be employed in further variations, for example, to assist the Red Cross or a government agency to find and schedule blood donors in a time of crisis, or to contact residents in a neighborhood about a particular hazard, such as a chemical spill, as would be apparent to a person of ordinary skill in the art, based on the disclosure herein.

In yet another exemplary embodiment of the present invention, referred to as "Adaptable Scheduling," the notification and response system 100 can notify designated recipients of a schedule change. For example, if a mode of mass transportation is delayed, such as a train or airline flight, or a commuter encounters traffic on his or her way to a meeting, the notification and response system 100 can be configured to notify interested parties of the schedule changes, and coordinate appropriate revisions to the schedules of participants. The calendar agent techniques described herein, for example, allow such schedule revisions to be automatically performed. A passenger can specify a communication flow rule that is initiated, for example, if an electronic mail message is received with the title="Flight Information*." The communication flow rule can provide information on who to contact in the event of a delay, such as a limousine service, colleague or spouse. The notification can provide information specific to the affected recipient. For example, the notice to the limousine service can request an alternate pickup time, and the notice to the colleague can request that a meeting be rescheduled (e.g., using the calendar agent) or that the colleague attend the meeting in the absence of the delayed passenger (using the delegates feature).

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure the associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for providing a message from a sender to at least one recipient in accordance with a communication flow having a plurality of potential paths, said method comprising:
   receiving said message from said sender;
   evaluating said communication flow, wherein said communication flow is controlled by a communication flow expression containing at least one primitive keyword that can substantially simultaneously evaluate a communication failure of said message and a content of one or more responses to said message and wherein said communication flow expression indicates how said message should be processed;
   processing said message based on said communication flow expression; and wherein said communication flow expression is evaluated using a three-valued logic.

2. The method of claim 1, wherein said primitive keyword indicates that two specified operands, A and B, should be contacted simultaneously and that the communication flow expression will succeed if and only if both A and B respond successfully.

3. The method of claim 1, wherein said primitive keyword indicates that for two specified operands, A and B, B should be contacted only if A responds successfully and that the communication flow expression will succeed if and only if both A and B respond successfully.

4. The method of claim 1, wherein said primitive keyword indicates that two specified operands, A and B, should be contacted simultaneously and that the communication flow expression will succeed as long as either A or B respond successfully.

5. The method of claim 1, wherein said primitive keyword indicates that for two specified operands, A and B, B should be contacted only if the attempt to contact A is a failure and that the communication flow expression will succeed if either A or B responds successfully.

6. The method of claim 1, wherein said primitive keyword indicates that two specified operands, A and B, should be contacted simultaneously and that the communication flow expression shall have a value of the first contact to respond.

7. The method of claim 1, wherein said primitive keyword indicates that for two specified operands, A and B, B should be contacted only if the attempt to contact A is a failure and that the communication flow expression shall have a value of the first non-maybe response.

8. The method of claim 1, wherein said primitive keyword indicates that recipients should be contacted simultaneously and that the communication flow expression will succeed if a certain threshold of success responses is received.

9. The method of claim 1, wherein said primitive keyword indicates that recipients should be contacted sequentially and that the communication flow expression will succeed if a certain threshold of success responses is received.

10. The method of claim 1, wherein said primitive keyword indicates that recipients should be contacted in parallel.

11. The method of claim 10, further comprising the step of canceling outstanding requests when said outstanding requests are complete.

12. The method of claim 1, wherein said primitive keyword indicates that recipients should be contacted sequentially.

13. The method of claim 1, wherein said primitive keyword indicates that one or more potential operand values should be reversed.

14. The method of claim 1, wherein said three possible logic values are maybe, false, and true.

15. The method of claim 1, wherein said communication flow expression includes a success test indicating when said communication flow expression should terminate.

16. The method of claim 15, wherein said success test specifies a three-valued logical expression on the variables that may be included in the response received from said at least one recipient.

17. The method of claim 15, wherein said success test can perform aggregation and process said responses over all the responses received.

18. The method of claim 1, wherein said communication flow expression permits a matter to be escalated to a next level and cancels pending messages associated with a current level prior to said escalation.

19. The method of claim 1, wherein said communication flow expression permits a matter to be escalated to a next level and maintains pending messages associated with a current level prior to said escalation.

20. The method of claim 1, wherein said communication flow expression define the preferences of said sender and said at least one recipient.

21. The method of claim 1, wherein said communication flow expression is evaluated at the time of delivery to said at least one recipient.

22. The method of claim 1, wherein said communication flow expression references a communication flow rule defined by said at least one recipient, wherein said communication flow rule can adjust said communication flow to characteristics of said sender.

23. The method of claim 1, wherein said communication flow expression references a communication flow rule defined by said at least one recipient, wherein said communication flow rule can adjust said communication flow to characteristics of said message.

24. The method of claim 1, wherein said communication flow expression indicates one or more actions to perform if said at least one recipient does not respond to said message.

25. The method of claim 1, wherein said communication flow expression allows said at least one recipient to delegate said message to another recipient.

26. The method of claim 1, wherein said communication flow expression allows said at least one recipient to delegate said message to another recipient after reading said message.

27. The method of claim 1, wherein said communication flow expression indicates preferences of said at least one recipient using temporal constraints.

28. The method of claim 1, wherein said communication flow expression indicates preferences of said at least one recipient using temporal domains.

29. The method of claim 1, wherein said communication flow expression notifies one or more designated persons in the event of an emergency.

30. A method for providing a message from a sender to at least one recipient in accordance with a communication flow having a plurality of potential paths, said method comprising:
receiving said message from said sender;
evaluating said communication flow, wherein said communication flow is controlled by a communication flow expression indicating how said message should be processed, wherein said communication flow expression is evaluated using a three-valued logic that can represent the substantially simultaneous evaluation of a communication failure of said message and a content of one or more responses to said message; and
processing said message based on said communication flow expression.

31. A system for providing a message from a sender to at least one recipient in accordance with a communication flow having a plurality of potential paths, said system comprising:
a memory that stores computer-readable code; and
a processor operatively coupled to said memory, said processor configured to implement said computer-readable code, said computer-readable code configured to:
receive said message horn said sender;
evaluate said communication flow, wherein said communication flow is controlled by a communication flow expression containing at least one primitive keyword that can substantially simultaneously evaluate a communication failure of said message and a content of one or more responses to said message and wherein said communication flow expression indicates how said message should be processed;
process said message based on said communication flow expression; and wherein said communication flow expression is evaluated using a three-valued logic.

32. A system for providing a message from a sender to at least one recipient in accordance with a communication flow having a plurality of potential paths, said system comprising:
a memory that stores computer-readable code; and
a processor operatively coupled to said memory, said processor configured to implement said computer-readable code, said computer-readable code configured to:
receive said message from said sender;
evaluate said communication flow, wherein said communication flow is controlled by a communication flow expression indicating how said message should be processed, wherein said communication flow expression is evaluated using a three-valued logic that can represent the substantially simultaneous evaluation of a communication failure of said message and a content of one or more responses to said message; and
process said message based on said communication flow expression.

33. A system for providing a message from a sender to at least one recipient in accordance with a communication flow having a plurality of potential paths, said system comprising:
means for receiving said message from said sender;
means for evaluation said communication flow, wherein said communication flow is controlled by a communication flow expression containing at least one primitive keyword that can substantially simultaneously evaluate a communication failure of said message and a content of one or more responses to said message and wherein said communication flow expression indicates how said message should be processed;
means for processing said message based on said communication flow expression; and further comprising means for evaluating said communication flow expression using a three-valued logic.

34. An article of manufacture for providing a message from a sender to at least one recipient in accordance with a communication flow having a plurality of potential paths, said article of manufacture comprising:
a computer readable medium having computer readable code means embodied thereon, said computer readable program code means comprising:
a step to receive said message from said sender;

a step to evaluate said communication flow, wherein said communication flow is controlled by a communication flow expression containing at least one primitive keyword that can substantially simultaneously evaluate a communication failure of said message and a content of one or more responses to said message and wherein said communication flow expression indicates how said message should be processed;

a step to process said message based on said communication flow expression; and said computer readable program code means further comprising a step to evaluate said communication flow expression using a three-valued logic.

* * * * *